US011955275B2

(12) United States Patent
Ishima et al.

(10) Patent No.: US 11,955,275 B2
(45) Date of Patent: Apr. 9, 2024

(54) METHOD FOR PRODUCING MULTILAYER COIL COMPONENT

(71) Applicant: TDK CORPORATION, Tokyo (JP)

(72) Inventors: Yuya Ishima, Tokyo (JP); Shinichi Kondo, Tokyo (JP); Kosuke Ito, Tokyo (JP); Shingo Hattori, Tokyo (JP); Takashi Suzuki, Tokyo (JP); Hidenobu Umeda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 369 days.

(21) Appl. No.: 17/004,334

(22) Filed: Aug. 27, 2020

(65) Prior Publication Data

US 2021/0065975 A1 Mar. 4, 2021

(30) Foreign Application Priority Data

Aug. 28, 2019 (JP) ................................ 2019-156077

(51) Int. Cl.
*H01F 41/04* (2006.01)
*H01F 27/28* (2006.01)
*H01F 41/12* (2006.01)

(52) U.S. Cl.
CPC ....... *H01F 41/041* (2013.01); *H01F 27/2804* (2013.01); *H01F 41/04* (2013.01); *H01F 41/12* (2013.01); *H01F 2027/2809* (2013.01)

(58) Field of Classification Search
CPC .... H01F 41/041; H01F 27/2804; H01F 41/04; H01F 41/12; H01F 2027/2809
See application file for complete search history.

(56) References Cited

U.S. PATENT DOCUMENTS

2010/0026443 A1* 2/2010 Yan .................... H01F 17/0013 336/234
2013/0214890 A1* 8/2013 Zabaco .................. H01F 38/14 336/200

(Continued)

FOREIGN PATENT DOCUMENTS

| | | | |
|---|---|---|---|
| CN | 105359233 | A | 2/2016 |
| JP | 2017-216409 | A | 12/2017 |
| JP | 2018-61008 | A | 4/2018 |

OTHER PUBLICATIONS

Pang, L., "Transfer printing of flexible hybrid inductor-capacitor filters via pre-etched silicon-on-insulator mother wafer", Appl. Phys. Lett, 101, 063112, 2012 (Year: 2012).*

*Primary Examiner* — Peter Dungba Vo
*Assistant Examiner* — Jose K Abraham
(74) *Attorney, Agent, or Firm* — Oliff PLC

(57) ABSTRACT

A method for producing a multilayer coil component includes forming, on a main face of a substrate, a first coil conductor extending along the main face having conductivity, forming a second coil conductor and a third coil conductor apart from each other in a direction in which the first coil conductor extends and each extending from the first coil conductor in a first direction orthogonal to the main face, and forming a fourth coil conductor electrically connected to an end of the second coil conductor opposite to the first coil conductor and extending along the main face. The forming the first coil conductor includes forming, on the main face, a first insulator layer provided with a first penetration portion having a shape corresponding to the first coil conductor and exposing a part of the main face, and forming, by plating, the first coil conductor in the first penetration portion.

8 Claims, 19 Drawing Sheets

(56) References Cited

U.S. PATENT DOCUMENTS

| | | | | |
|---|---|---|---|---|
| 2014/0078643 | A1* | 3/2014 | Odahara | H01F 17/0013 156/89.12 |
| 2014/0145815 | A1* | 5/2014 | Ishii | H01F 17/0013 336/200 |
| 2015/0002256 | A1 | 1/2015 | Bourns et al. | |
| 2016/0093434 | A1* | 3/2016 | Hamada | H01F 41/046 29/605 |
| 2016/0248450 | A1* | 8/2016 | Ishizuka | H04B 1/0053 |
| 2017/0271084 | A1* | 9/2017 | Moriya | H01F 5/00 |
| 2017/0345558 | A1* | 11/2017 | Sekiguchi | H01F 27/29 |
| 2017/0352467 | A1 | 12/2017 | Kakiuchi et al. | |
| 2018/0096778 | A1* | 4/2018 | Yatabe | H01F 27/292 |
| 2018/0096780 | A1* | 4/2018 | Sekiguchi | H01F 27/2804 |
| 2019/0115145 | A1* | 4/2019 | Kim | H01F 27/32 |
| 2019/0180929 | A1* | 6/2019 | Hur | H01F 17/0013 |

* cited by examiner

METHOD FOR PRODUCING MULTILAYER COIL COMPONENT

TECHNICAL FIELD

The present disclosure relates to a method for producing a multilayer coil component and a multilayer coil component.

BACKGROUND

Japanese Unexamined Patent Publication No. 2017-216409 discloses a method for producing an electronic component including a coil portion formed of a plurality of columnar conductors and a plurality of coupling conductors. In this producing method, the plurality of columnar conductors and the plurality of coupling conductors are formed by plating.

SUMMARY

Technical Problem

In the above producing method, before and after each step of forming the plurality columnar conductors and the plurality of coupling conductors by plating, a step of forming a seed layer for electrical continuity and a step of removing an unnecessary seed layer are required. Thus, the number of steps is increased, and the productivity cannot be improved.

One aspect of the present disclosure provides a method for producing a multilayer coil component and a multilayer coil component that are capable of improving productivity.

Solution to Problem

A method for producing a multilayer coil component according to one aspect of the present disclosure, the method includes forming, on a main face of a substrate, a first coil conductor extending along the main face, at least the main face having conductivity, forming a second coil conductor and a third coil conductor apart from each other in a direction in which the first coil conductor extends and each extending from the first coil conductor in a first direction orthogonal to the main face, and forming a fourth coil conductor electrically connected to an end of the second coil conductor opposite to the first coil conductor and extending along the main face. The forming the first coil conductor includes forming, on the main face, a first insulator layer provided with a first penetration portion having a shape corresponding to the first coil conductor and exposing a part of the main face, and forming, by plating, the first coil conductor in the first penetration portion.

In this method for producing the multilayer coil component, the forming the first coil conductor includes forming, on the main face, a first insulator layer provided with a first penetration portion exposing a part of the main face. Since the main face has conductivity, it is not necessary to form a conductive layer for electrical continuity before forming the first coil conductor in the first penetration portion by plating. In addition, it is not necessary to remove an unnecessary conductive layer after forming the first coil conductor. Thus, it is possible to improve the productivity.

The forming the second coil conductor and the third coil conductor may include forming, on the first insulator layer formed with the first coil conductor, a second insulator layer provided with a second penetration portion having a shape corresponding to a second coil conductor portion constituting at least a part of the second coil conductor in the first direction and exposing a part of the first coil conductor, and with a third penetration portion having a shape corresponding to a third coil conductor portion constituting at least a part of the third coil conductor in the first direction and exposing a part of the first coil conductor, and forming, by plating, the second coil conductor portion in the second penetration portion and the third coil conductor portion in the third penetration portion. In this case, in the forming the second coil conductor and the third coil conductor, the second insulator layer provided with the second penetration portion and the third penetration portion each exposing a part of the first coil conductor is formed. Thus, it is not necessary to form a conductive layer for electrical continuity before forming, by plating, the second coil conductor portion in the second penetration portion and the third coil conductor portion in the third penetration portion. In addition, it is not necessary to remove an unnecessary conductive layer after forming the second coil conductor portion and the third coil conductor portion. Thus, it is possible to further improve the productivity.

In the forming the second coil conductor and the third coil conductor, the forming the second insulator layer and the forming the second coil conductor portion and the third coil conductor portion may be repeated. In this case, it is possible to increase the lengths of the second coil conductor and the third coil conductor in the first direction.

The forming the fourth coil conductor may include forming a conductive layer on the second insulator layer formed with the second coil conductor portion and the third coil conductor portion, forming, on the conductive layer, a third insulator layer provided with a fourth penetration portion having a shape corresponding to the fourth coil conductor and exposing a part of the conductive layer, and forming, by plating, the fourth coil conductor in the fourth penetration portion. In this case, in the forming the fourth coil conductor, the conductive layer is formed on the second insulator layer in advance. Thus, it is possible to form, by plating, the fourth coil conductor in a portion of the second insulator layer where the second coil conductor is not provided.

This method for producing the multilayer coil component may further include forming, after the fourth coil conductor is formed, a fourth insulator layer by removing the third insulator layer and a portion of the conductive layer, the portion being exposed from the fourth coil conductor, to expose a part of the second insulator layer, the fourth insulator layer covering the part of the second insulator layer that is exposed and the fourth coil conductor. In this case, since the fourth coil conductor is covered with the fourth insulator layer, it is possible to protect the fourth coil conductor.

This method for producing the multilayer coil component may further include forming, after the fourth coil conductor is formed, a fifth insulator layer on the first insulator layer formed with the first coil conductor by peeling the first insulator layer formed with the first coil conductor from the main face. In this case, since the first coil conductor is covered with the fifth insulator layer, it is possible to protect the first coil conductor.

The first insulator layer may be formed by a photolithography method. In this case, it is possible to pattern the first insulator layer with high shape accuracy. As a result, it is possible to form the first coil conductor with high shape accuracy.

In the forming the first coil conductor, a plurality of the first coil conductors disposed in a second direction intersecting with the direction in which the first coil conductor extends may be formed. In the forming the second coil conductor and the third coil conductor, a plurality of the second coil conductors and a plurality of the third coil conductors each disposed in the second direction may be formed. In the forming the fourth coil conductor, a plurality of the fourth coil conductors disposed in the second direction may be formed. In this case, it is possible for the coil to have a multiple number of turns.

A multilayer coil component according to one aspect of the present disclosure includes an element body, a coil, and a conductive layer. The element body includes a plurality of insulator layers laminated in a first direction. The coil is disposed in the element body. The coil includes a first coil conductor, a second coil conductor, a third coil conductor, and a fourth coil conductor. The conductive layer electrically connects the second coil conductor and the fourth coil conductor. The first coil conductor extends in a direction orthogonal to the first direction. The second coil conductor and the third coil conductor are separated from each other in the direction in which the first coil conductor extends. The second coil conductor and the third coil conductor each extend from the first coil conductor in the first direction. The fourth coil conductor is electrically connected to an end of the second coil conductor opposite to the first coil conductor. The fourth coil conductor extends in a direction orthogonal to the first direction. The conductive layer overlaps the fourth coil conductor when viewed from the first direction.

In this multilayer coil component, the second coil conductor and the third coil conductor each extend from the first coil conductor in the first direction. In this manner, since the second coil conductor and the third coil conductor are directly connected to the first coil conductor, it is possible to omit, as compared with a configuration in which, for example, the second coil conductor and the third coil conductor are connected to the first coil conductor via a conductive layer, at least a step of forming the conductive layer. Accordingly, it is possible to improve the productivity.

DETAILED DESCRIPTION

Hereinafter, an embodiment will be described in detail with reference to the accompanying drawings. In the description of the drawings, identical or equivalent elements are denoted by the same reference signs, and overlapped descriptions are omitted.

(Multilayer Coil Component)

Figure 1:
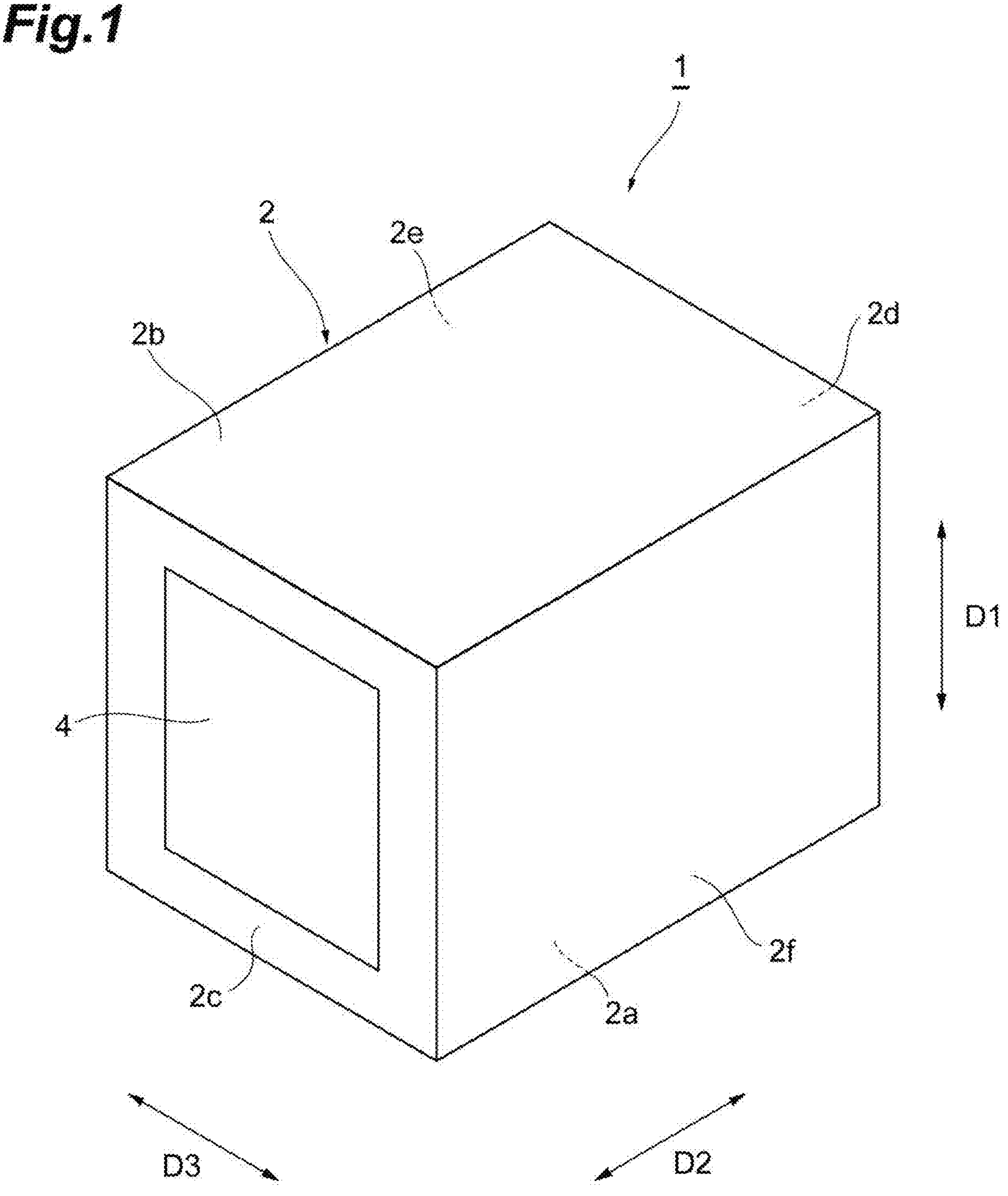
FIG. 1 is a perspective view of a multilayer coil component according to an embodiment.

FIG. 1 is a perspective view of a multilayer coil component according to an embodiment. As shown in FIG. 1, a multilayer coil component 1 includes an element body 2 having a rectangular parallelepiped shape. The rectangular parallelepiped shape includes a rectangular parallelepiped shape in which the corner portions and the ridge portions are chamfered, and a rectangular parallelepiped shape in which the corner portions and the ridge portions are rounded.

The element body 2 has a pair of main faces 2*a* and 2*b* opposed to each other, a pair of end faces 2*c* and 2*d* opposed to each other, and a pair of side faces 2*e* and 2*f* opposed to each other. In the following description, it is assumed that the direction in which the pair of main faces 2*a* and 2*b* is opposed is a first direction D1, that the direction in which the pair of end faces 2*c* and 2*d* is opposed is a second direction D2, and that the direction in which the pair of side faces 2*e* and 2*f* is opposed is a third direction D3. In the present embodiment, the first direction D1 is the height direction of the element body 2. The second direction D2 is the length direction of the element body 2 and is orthogonal to the first direction D1. The third direction D3 is the width direction of the element body 2 and is orthogonal to the first direction D1 and the second direction D2.

The pair of main faces 2*a* and 2*b* extends in the second direction D2 in such a way as to connect the pair of end faces 2*c* and 2*d*. The pair of main faces 2*a* and 2*b* also extends in the third direction D3 in such a way as to connect the pair of side faces 2*e* and 2*f*. The pair of end faces 2*c* and 2*d* extends in the first direction D1 in such a way as to connect the pair of main faces 2*a* and 2*b*. The pair of end faces 2*c* and 2*d* also extends in the third direction D3 in such a way as to connect the pair of side faces 2*e* and 2*f*. The pair of side faces 2*e* and 2*f* extends in the first direction D1 in such a way as to connect the pair of main faces 2*a* and 2*b*. The pair of side faces 2*e* and 2*f* also extends in the second direction D2 in such a way as to connect the pair of end faces 2*c* and 2*d*.

The length of the multilayer coil component 1 in the first direction D1 (the height) is, for example, 0.05 mm or more and 1.00 mm or less. The length of the multilayer coil component 1 in the second direction D2 (the length) is, for example, 0.01 mm or more and 2.00 mm or less. The length of the multilayer coil component 1 in the third direction D3 (the width) is, for example, 0.05 mm or more and 1.00 mm or less. In the present embodiment, the length of the multilayer coil component 1 in the first direction D1 (the height) is 0.125 mm. The length of the multilayer coil component 1 in the second direction D2 (the length) is 0.250 mm or less. The length of the multilayer coil component 1 in the third direction D3 (the width) is 0.200 mm or less. The multilayer coil component 1 is, for example, solder-mounted on an electronic device (for example, a circuit board or an electronic component). In the multilayer coil component 1, the main face 2*a* constitutes a mounting surface opposed to the electronic device.

Figure 2:
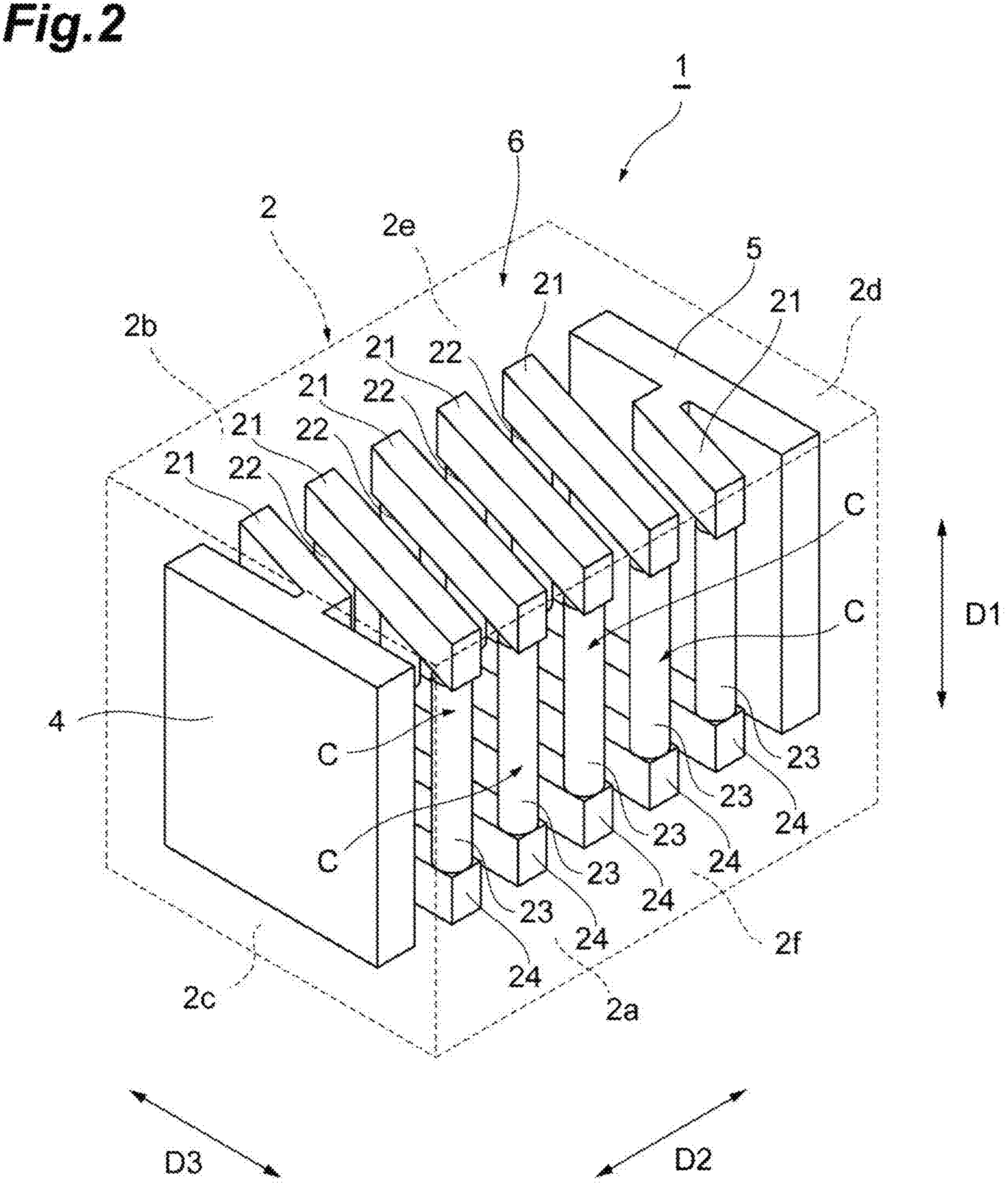
FIG. 2 is a perspective view showing an internal structure of the multilayer coil component in FIG. 1.

FIG. 2 is a perspective view showing an internal structure of the multilayer coil component in FIG. 1. In FIG. 2, the element body 2 is shown by a broken line. As shown in FIG. 2, the multilayer coil component 1 includes a plurality (in this specification, a pair) of terminal electrodes 4 and 5, a coil 6, and conductive layers 25, 26, and 27 (see FIG. 3).

The terminal electrodes 4 and 5 each have a rectangular plate shape. The terminal electrodes 4 and 5 are disposed at both end portions of the element body 2 in the second direction D2. The terminal electrode 4 is disposed on the end face 2*c* side. One main face of the terminal electrode 4 is embedded further inside the element body 2 than the end face 2*c* and is connected to one end of the coil 6 in the element body 2. The other main face of the terminal electrode 4 is exposed from the end face 2*c* and constitutes the same plane as the end face 2*c*. The other main face of the terminal electrode 4 may protrude from the end face 2*c*. The terminal electrode 4 is disposed further inside than the outer edge of the end face 2*c* when viewed from the second direction D2.

The terminal electrode 5 is disposed on the end face 2*d* side. One main face of the terminal electrode 5 is embedded further inside the element body 2 than the end face 2*d* and is connected to the other end of the coil 6 in the element body 2. The other main face of the terminal electrode 5 is exposed from the end face 2*d* and constitutes the same plane as the end face 2*d*. The other main face of the terminal electrode 5 may protrude from the end face 2*d*. The terminal electrode 5 is disposed further inside than the outer edge of the end face 2*d* when viewed from the second direction D2.

Each of the terminal electrodes 4 and 5 contains a conductive material (for example, Cu). The surfaces of the terminal electrodes 4 and 5 protruding from the respective end faces 2*c* and 2*d* may be each formed with a plating layer. The plating layer is formed by, for example, electroplating or electroless plating. The plating layer contains, for example, Ni or Sn.

The coil 6 is disposed in the element body 2. In the present embodiment, the entire coil 6 is disposed inside the element body 2. The coil axis of the coil 6 extends along the second direction D2. The outer diameter of the coil 6 has a substantially rectangular shape when viewed from the third direction D3. The coil 6 includes a first coil conductor 21, a second coil conductor 22, a third coil conductor 23, and a fourth coil conductor 24.

In the present embodiment, the coil 6 includes a plurality of first coil conductors 21, a plurality of second coil conductors 22, a plurality of third coil conductors 23, and a plurality of fourth coil conductors 24. The coil 6 is formed of the plurality of first coil conductors 21, the plurality of second coil conductors 22, the plurality of third coil conductors 23, and the plurality of fourth coil conductors 24.

Each first coil conductor 21, each second coil conductor 22, each third coil conductor 23, and each fourth coil conductor 24 include a conductive material (for example, Cu). In the present embodiment, the number of the first coil conductors 21 is "6", and the number of each of the second coil conductors 22, the third coil conductors 23, and the fourth coil conductors 24 is "5". The coil 6 is formed by electrically connecting the plurality of first coil conductors 21, the plurality of second coil conductors 22, the plurality of third coil conductors 23, and the plurality of fourth coil conductors 24 with each other.

The plurality of first coil conductors 21 and the plurality of fourth coil conductors 24 are disposed in such a way as to be opposed to each other in the first direction D1. The plurality of first coil conductors 21 is disposed on the main face 2*b* side, and the plurality of fourth coil conductors 24 is disposed on the main face 2*a* side. The plurality of second coil conductors 22 and the plurality of third coil conductors 23 are disposed in such a way as to be opposed to each other in the third direction D3. The plurality of second coil conductors 22 is disposed on the side face 2*e* side, and the plurality of third coil conductors 23 is disposed on the side face 2*f* side.

Each first coil conductor 21, each second coil conductor 22, each third coil conductor 23, and each fourth coil conductor 24 have, for example, linear shapes or rod shapes and extend in the direction intersecting with the coil axis. Each first coil conductor 21 and each fourth coil conductor 24 have rectangular cross sections. Each second coil conductor 22 and each third coil conductor 23 have circular cross sections.

Each first coil conductor 21 and each fourth coil conductor 24 extend in a direction orthogonal to the first direction D1. The direction in which each first coil conductor 21 extends is slightly inclined with respect to the direction in which each fourth coil conductor 24 extends. Each first coil conductor 21 extends in, for example, a direction slightly inclined from the third direction D3. Each fourth coil conductor 24 extends in, for example, the third direction D3. Each second coil conductor 22 and each third coil conductor 23 extend in the first direction D1.

The plurality of first coil conductors 21 is parallel to each other and is disposed apart from each other in the second direction D2. The plurality of second coil conductors 22 is parallel to each other and is disposed apart from each other in the second direction D2. The plurality of third coil conductors 23 is parallel to each other and is disposed apart from each other in the second direction D2. The plurality of fourth coil conductors 24 is parallel to each other and is disposed apart from each other in the second direction D2.

The plurality of first coil conductors 21 is referred to as a first first coil conductor 21, a second first coil conductor 21, a third first coil conductor 21, a fourth first coil conductor 21, a five first coil conductor 21, and a sixth first coil conductor 21 in the order from the end face 2*c* side. The plurality of the second coil conductors 22 is referred to as a first second coil conductor 22, a second second coil conductor 22, a third second coil conductor 22, a fourth second coil conductor 22, and a fifth second coil conductor 22 in the order from the end face 2*c* side.

The plurality of third coil conductors 23 is referred to as a first third coil conductor 23, a second third coil conductor 23, a third third coil conductor 23, a fourth third coil conductor 23, and a fifth third coil conductor 23 in the order from the end face 2c side. The plurality of fourth coil conductors 24 is referred to as a first fourth coil conductor 24, a second fourth coil conductor 24, a third fourth coil conductor 24, a fourth fourth coil conductor 24, and a fifth fourth coil conductor 24 in the order from the end face 2c side.

One end of the first first coil conductor 21 is connected to the terminal electrode 4. The other end of the first first coil conductor 21 is connected to one end of the first second coil conductor 22. The other end of the first second coil conductor 22 is connected to one end of the first fourth coil conductor 24. The other end of the first fourth coil conductor 24 is connected to one end of the first third coil conductor 23. The other end of the first third coil conductor 23 is connected to one end of the second first coil conductor 21.

The other end of the second first coil conductor 21 is connected to one end of the second second coil conductor 22. The other end of the second second coil conductor 22 is connected to one end of the second fourth coil conductor 24. The other end of the second fourth coil conductor 24 is connected to one end of the second third coil conductor 23. The other end of the second third coil conductor 23 is connected to one end of the third first coil conductor 21.

The other end of the third first coil conductor 21 is connected to one end of the third second coil conductor 22. The other end of the third second coil conductor 22 is connected to one end of the third fourth coil conductor 24. The other end of the third fourth coil conductor 24 is connected to one end of the third third coil conductor 23. The other end of the third third coil conductor 23 is connected to one end of the fourth first coil conductor 21.

The other end of the fourth first coil conductor 21 is connected to one end of the fourth second coil conductor 22. The other end of the fourth second coil conductor 22 is connected to one end of the fourth fourth coil conductor 24. The other end of the fourth fourth coil conductor 24 is connected to one end of the fourth third coil conductor 23. The other end of the fourth third coil conductor 23 is connected to one end of the fifth first coil conductor 21.

The other end of the fifth first coil conductor 21 is connected to one end of the fifth second coil conductor 22. The other end of the fifth second coil conductor 22 is connected to one end of the fifth fourth coil conductor 24. The other end of the fifth fourth coil conductor 24 is connected to one end of the fifth third coil conductor 23. The other end of the fifth third coil conductor 23 is connected to one end of the sixth first coil conductor 21. The other end of the sixth first coil conductor 21 is connected to the terminal electrode 5.

Figure 3:
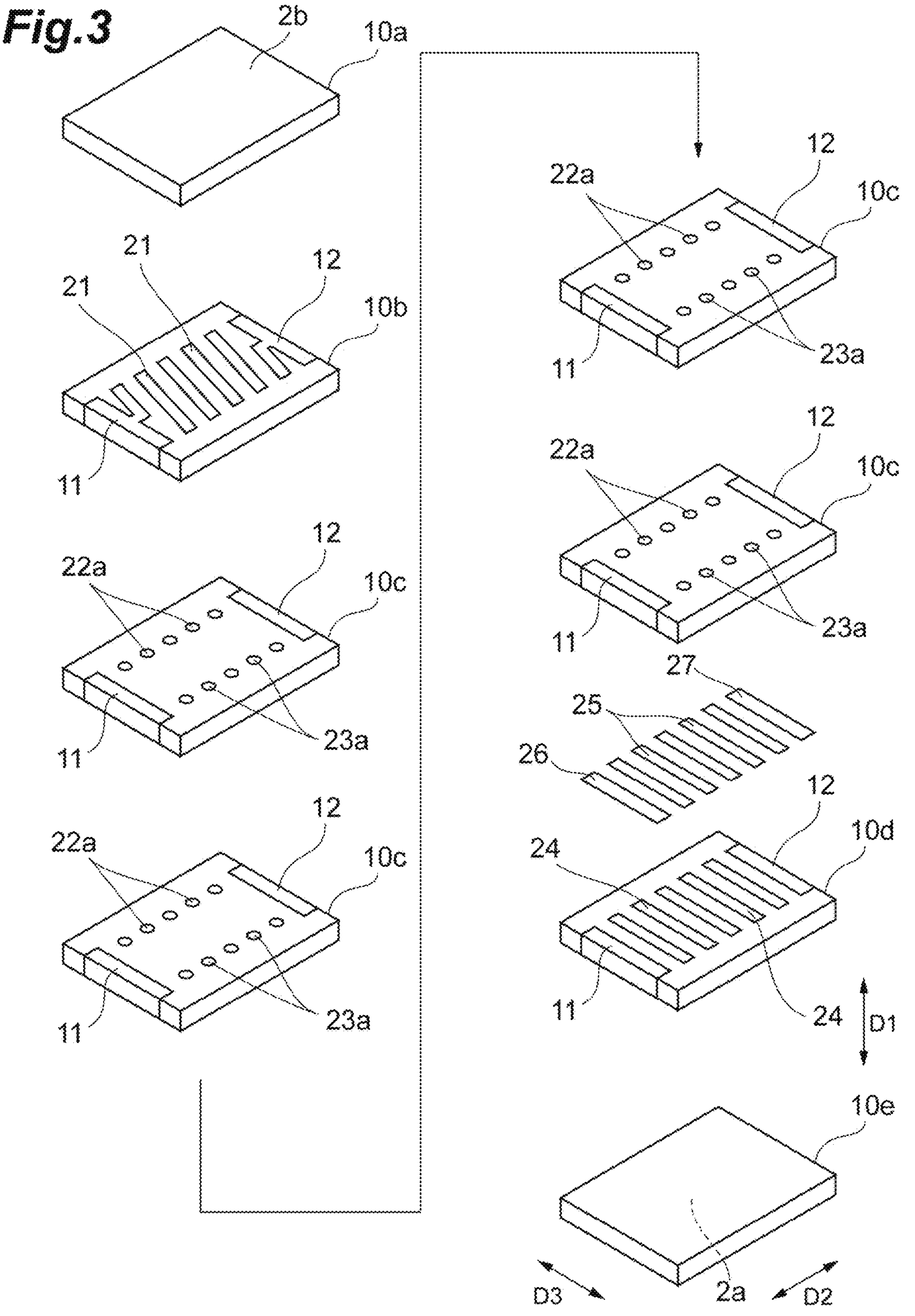
FIG. 3 is an exploded perspective view of the multilayer coil component in FIG. 1.

The other end of each second coil conductor 22 and the one end of each corresponding fourth coil conductor 24 are electrically connected via the corresponding conductive layer 25 (see FIG. 3). The one end of each third coil conductor 23 and the other end of each corresponding fourth coil conductor 24 are electrically connected via the corresponding conductive layer 25. In FIG. 2, the conductive layer 25 is not shown. The conductive layer 25 will be described later.

The coil 6 includes at least one or more one-turn unit coil C formed of one first coil conductor 21, one second coil conductor 22, one third coil conductor 23, and one fourth coil conductor 24. In the present embodiment, the coil 6 includes four unit coils C. The plurality of unit coils C is disposed in the second direction D2. The adjacent unit coils C are connected to each other.

In the present embodiment, the unit coil C formed of the second first coil conductor 21, the second second coil conductor 22, the first third coil conductor 23, and the first fourth coil conductor 24 is referred to as a first unit coil C. The unit coil C formed of the third first coil conductor 21, the third second coil conductor 22, the second third coil conductor 23, and the second fourth coil conductor 24 is referred to as a second unit coil C. The unit coil C formed of the fourth first coil conductor 21, the fourth second coil conductor 22, the third third coil conductor 23, and the third fourth coil conductor 24 is referred to as a third unit coil C. The unit coil C formed of the fifth first coil conductor 21, the fifth second coil conductor 22, the fourth third coil conductor 23, and the fourth fourth coil conductor 24 is referred to as a fourth unit coil C.

In each unit coil C, the second coil conductor 22 and the third coil conductor 23 are apart from each other in the direction in which the first coil conductor 21 extends, and each extend from the first coil conductor 21 in the first direction D1. The fourth coil conductor 24 is electrically connected to the end of the second coil conductor 22 opposite to the first coil conductor 21.

FIG. 3 is an exploded perspective view of the multilayer coil component in FIG. 1. In FIG. 3, the terminal electrodes 4 and 5 (see FIG. 1) are not shown. As shown in FIG. 3, the element body 2 (see FIG. 1) is formed by laminating a plurality of insulator layers 10a, 10b, 10c, 10d, and 10e in the first direction D1 in this order. The element body 2 includes the plurality of insulator layers 10a, 10b, 10c, 10d, and 10e laminated in the first direction D1. The insulator layer 10a includes the main face 2b. The insulator layer 10e includes the main face 2a. The number of each of the insulator layers 10a, 10b, 10c, 10d, and 10e is “1” or more. In the present embodiment, the number of the insulator layers 10c is “4”.

In the element body 2, the lamination direction in which the plurality of insulator layers 10a, 10b, 10c, 10d, and 10e is laminated is aligned with the first direction D1. In the actual element body 2, the insulator layers 10a, 10b, 10c, 10d, and 10e are integrated in such a way that boundaries between the layers cannot be visually recognized. In the present embodiment, the insulator layers 10d and 10e are integrally formed without boundaries, but may be formed separately.

Each of the insulator layers 10a, 10b, 10c, 10d, and 10e is made of an insulating material. The insulating material contains, for example, a resin, such as a photosensitive resin. The photosensitive resin includes, for example, epoxy, polyimide, bismaleimide, or polyphenylene ether. Each of the insulator layers 10a, 10b, 10c, 10d, and 10e may include a filler made of, for example, silica or glass having low permittivity. The thickness (length in the first direction D1) of each of the insulator layers 10a, 10b, 10c, 10d, and 10e is, for example, 0.01 μm or more and 10 μm or less. In the present embodiment, the thickness of each of the insulator layers 10a, 10b, 10c, 10d, and 10e is 15 μm.

Each first coil conductor 21 is formed in a penetration portion provided in the insulator layer 10b and penetrates the insulator layer 10b in the first direction D1. Each fourth coil conductor 24 is formed in a penetration portion provided in the insulator layer 10d and penetrates the insulator layer 10d in the first direction D1.

Each second coil conductor 22 includes at least one or more second coil conductor portions 22a. In the present embodiment, the number of the second coil conductor portions 22a is “4”. The plurality of second coil conductor portions 22a is aligned in the first direction D1. The adjacent second coil conductor portions 22*a* in the first direction D1 are directly connected to each other. Each second coil conductor portions 22*a* is formed in a penetration portion provided in each insulator layer 10*c* and penetrates each insulator layer 10*c* in the first direction D1. Each second coil conductor portion 22*a* constitutes at least a part of the second coil conductor 22 in the first direction D1.

Each third coil conductor 23 includes at least one or more third coil conductor portions 23*a*. In the present embodiment, the number of the third coil conductor portions 23*a* is "4". The plurality of third coil conductor portions 23*a* is aligned in the first direction D1. The adjacent third coil conductor portions 23*a* in the first direction D1 are directly connected to each other. Each of the plurality of third coil conductor portions 23*a* is formed in a penetration portion provided in each insulator layer 10*c* and penetrates each insulator layer 10*c* in the first direction D1. Each third coil conductor portion 23*a* constitutes at least a part of the third coil conductor 23 in the first direction D1.

The plurality of conductive layers 25 has the same shape as the plurality of fourth coil conductors 24 when viewed from the first direction D1 and overlaps the plurality of fourth coil conductors 24. The plurality of conductive layers 25 is disposed between the plurality of fourth coil conductors 24, and the plurality of second coil conductors 22 and the plurality of third coil conductors 23. More specifically, each conductive layer 25 is disposed between the corresponding fourth coil conductor 24, and the second coil conductor portion 22*a* and the third coil conductor portion 23*a* that are adjacent to the fourth coil conductor 24 in the first direction D1. In the present embodiment, the number of the conductive layers 25 is "5" similarly to the number of the fourth coil conductors 24.

Each conductive layer 25 contains a conductive material. Each conductive layer 25 is made of, for example, Cr or Ti. Each conductive layer 25 electrically connects one end of the corresponding fourth coil conductor 24 and the other end of the corresponding second coil conductor 22. Each conductive layer 25 electrically connects the other end of the corresponding fourth coil conductor 24 and one end of the corresponding third coil conductor 23.

The terminal electrode 4 is formed by laminating a plurality of terminal conductors 11 and a conductive layer 26. The terminal electrode 4 includes the plurality of terminal conductors 11 and the conductive layer 26 that are laminated. In the present embodiment, the number of the terminal conductors 11 is "6". Each terminal conductor 11 is formed in a penetration portion provided in each of the insulator layers 10*b*, 10*c*, and 10*d* and penetrates each of the insulator layers 10*b*, 10*c*, and 10*d* in the first direction D1.

The conductive layer 26 has the same shape as the terminal conductor 11 when viewed from the first direction D1 and overlaps the terminal conductor 11. The conductive layer 26 is disposed between a terminal conductor 11 provided in the insulator layer 10*d* and a terminal conductor 11 adjacent to the terminal conductor 11 in the first direction D1. The conductive layer 26 contains a conductive material. The conductive layer 26 is made of, for example, Cr or Ti. The conductive layer 26 electrically connects the terminal conductor 11 provided in the insulator layer 10*d* and the terminal conductor 11 adjacent to the terminal conductor 11 in the first direction D1.

The terminal electrode 5 is formed by laminating a plurality of terminal conductors 12 and a conductive layer 27. The terminal electrode 5 includes the plurality of terminal conductors 12 and the conductive layer 27 that are laminated. In the present embodiment, the number of the terminal conductors 12 is "6". Each terminal conductor 12 is formed in a penetration portion provided in each of the insulator layers 10*b*, 10*c*, and 10*d* and penetrates each of the insulator layers 10*b*, 10*c*, and 10*d* in the first direction D1.

The conductive layer 27 has the same shape as the terminal conductor 12 when viewed from the first direction D1 and overlaps the terminal conductor 12. The conductive layer 27 is disposed between a terminal conductor 12 provided in the insulator layer 10*d* and a terminal conductor 12 adjacent to the terminal conductor 12 in the first direction D1. The conductive layer 27 contains a conductive material. The conductive layer 27 is made of, for example, Cr or Ti. The conductive layer 27 electrically connects a terminal conductor 12 provided in the insulator layer 10*c* and a terminal conductor 12 adjacent to the terminal conductor 12 in the first direction D1.

The thicknesses (lengths in the first direction D1) of the conductive layers 25, 26, and 27 are equal to each other. The thickness of each of the conductive layers 25, 26, and 27 is, for example, thinner than the thickness of each of the insulator layers 10*a*, 10*b*, 10*c*, 10*d*, and 10*e*. The thickness of each of the conductive layers 25, 26, and 27 is, for example, 0.01 μm or more and 1.000 μm or less. In the present embodiment, the thickness of each of the conductive layers 25, 26, and 27 is, for example, 0.4 μm.

(Method for Producing Multilayer Coil Component)

Figure 4:
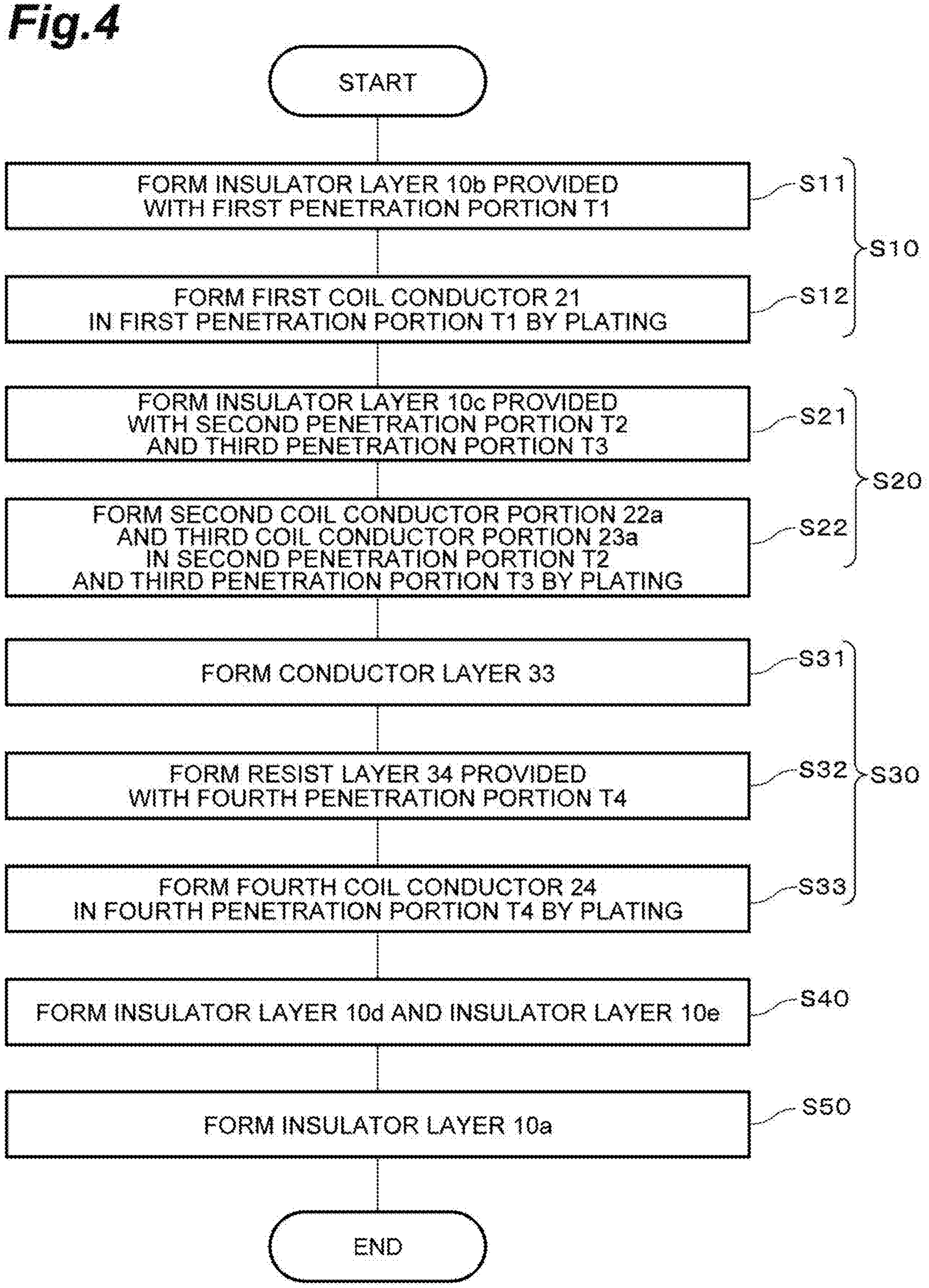
FIG. 4 is a flowchart showing a method for producing a multilayer coil component according to an embodiment.

A method for producing the multilayer coil component 1 will be described with reference to FIGS. 4 to 11C. As shown in FIG. 4, the method for producing the multilayer coil component 1 includes a step S10 of forming a first coil conductor 21, a step S20 of forming a second coil conductor 22 and a third coil conductor 23, a step S30 of forming a fourth coil conductor 24, a step S40 of forming insulator layers 10*d* and 10*e* (a fourth insulator layer), and a step S50 of forming an insulator layer 10*a* (a fifth insulator layer). The step S10, the step S20, the step S30, the step S40, and the step S50 are performed in this order.

Figure 5A:
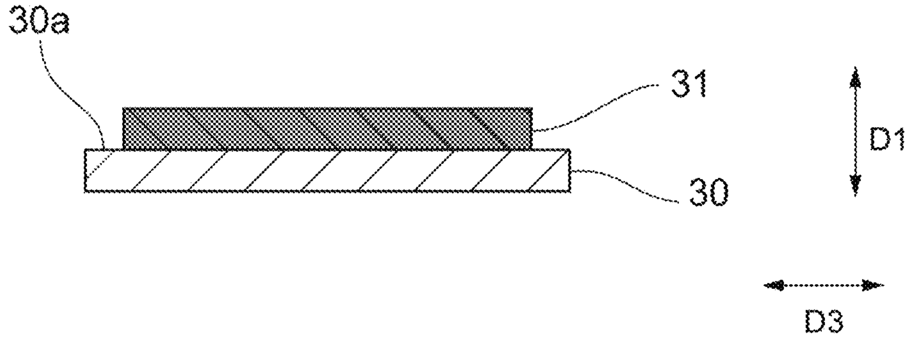
FIGS. 5A, 5B, and 5C are cross-sectional views for explaining the method for producing the multilayer coil component according to the embodiment.

In the step S10, as shown in FIG. 5A, first, a substrate 30 is prepared. The substrate 30 has a main face 30*a*. In the substrate 30, at least the main face 30*a* has conductivity. In the present embodiment, the entire substrate 30 has conductivity. The substrate 30 is made of, for example, stainless steel.

Then, a resist layer 31 is formed on the main face 30*a*. The resist layer 31 contains the constituent material of the insulator layer 10*b*. The resist layer 31 is formed by, for example, applying or printing an insulating paste containing a photosensitive resin on the main face 30*a*. The photosensitive resin contained in the insulating paste is a negative type.

Figure 5B:
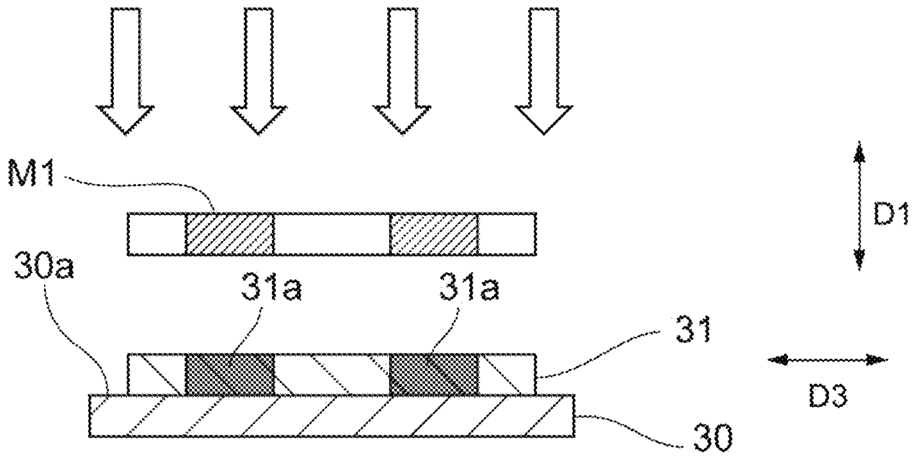

Then, as shown in FIG. 5B, the resist layer 31 is exposed. Here, a mask M1 made of, for example, Cr is used. The mask M1 has a pattern corresponding to the shapes of the plurality of first coil conductors 21, the terminal conductor 11, and the terminal conductor 12 shown in FIG. 3. In FIG. 5B, an unexposed portion 31*a* of the resist layer 31 is shown in gray.

Figure 5C:
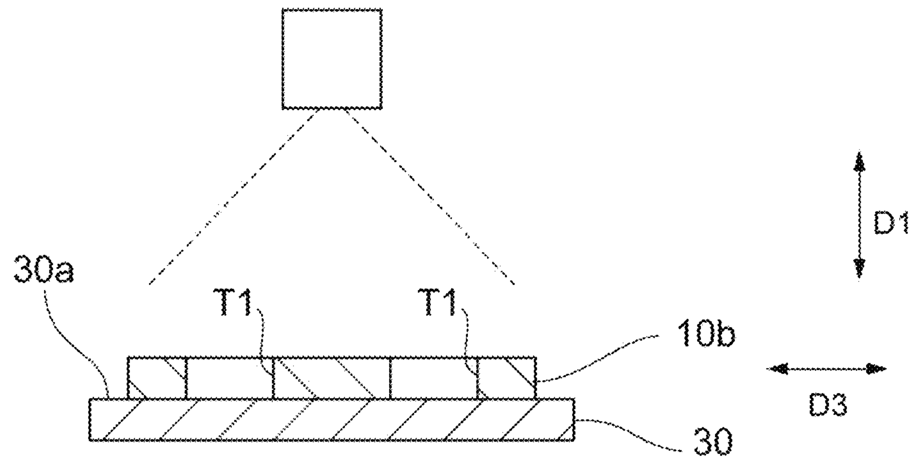

Then, as shown in FIG. 5C, the resist layer 31 is developed. Since the resist layer 31 contains a negative photosensitive resin, the unexposed portion 31*a* (see FIG. 5B) of the resist layer 31 is removed. As a result, the insulator layer 10*b* including a first penetration portion T1 having a shape corresponding to the plurality of first coil conductors 21 (see FIG. 3), a penetration portion (not shown) having a shape corresponding to the terminal conductor 11 (see FIG. 3), and a penetration portion (not shown) having a shape corresponding to the terminal conductor 12 (see FIG. 3) is obtained. The first penetration portion T1, the penetration portion having the shape corresponding to the terminal conductor 11, and the penetration portion having the shape corresponding to the terminal conductor 12 each expose a part of the main face 30*a* of the substrate 30.

Figure 6A:
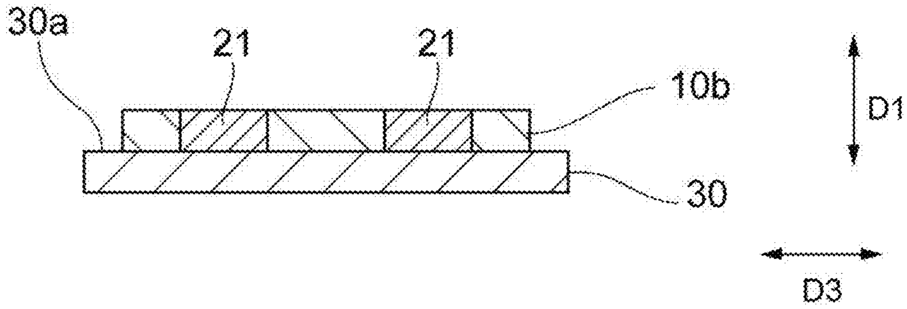
FIGS. 6A, 6B, and 6C are cross-sectional views for explaining the method for producing the multilayer coil component according to the embodiment.

Then, as shown in FIG. 6A, the plurality of first coil conductors 21 are formed, by plating, in the plurality of first penetration portions T1 of the insulator layer 10*b*. At this time, the terminal conductors 11 (see FIG. 3), and the terminal conductors 12 (see FIG. 3) are also formed in the penetration portions (not shown) of the insulator layer 10*b*. Accordingly, the insulator layer 10*b* provided with the plurality of first coil conductors 21. At this time, the terminal conductors 11, and the terminal conductors 12 is formed. The plating may be electrolytic plating or electroless plating. Here, the plurality of first coil conductors 21 disposed in the second direction D2 (see FIG. 2) is formed. If necessary, the plurality of first coil conductors 21 is polished.

As described above, the step S10 includes a step S11 of forming the insulator layer 10*b* (a first insulator layer) provided with the first penetration portion T1 and a step S12 of forming, by plating, the first coil conductor 21 in the first penetration portion T1. The insulator layer 10*b* provided with the first penetration portion T1 is formed by a photolithography method.

Figure 6B:
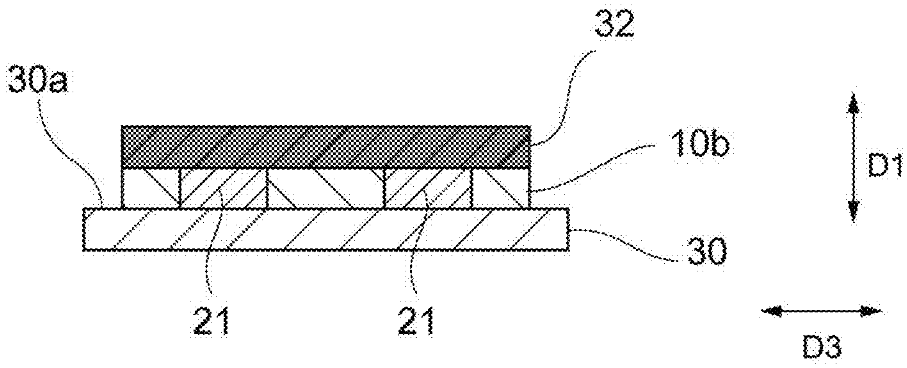

In the step S20, as shown in FIG. 6B, a resist layer 32 is formed on the insulator layer 10*b* provided with the plurality of first coil conductors 21, the terminal conductor 11 (see FIG. 3), and the terminal conductor 12 (see FIG. 3). The resist layer 32 contains the constituent material of the insulator layer 10*c* (see FIG. 3). The resist layer 32 is formed by, for example, applying or printing an insulating paste containing a photosensitive resin. The photosensitive resin contained in the insulating paste is a negative type.

Figure 6C:
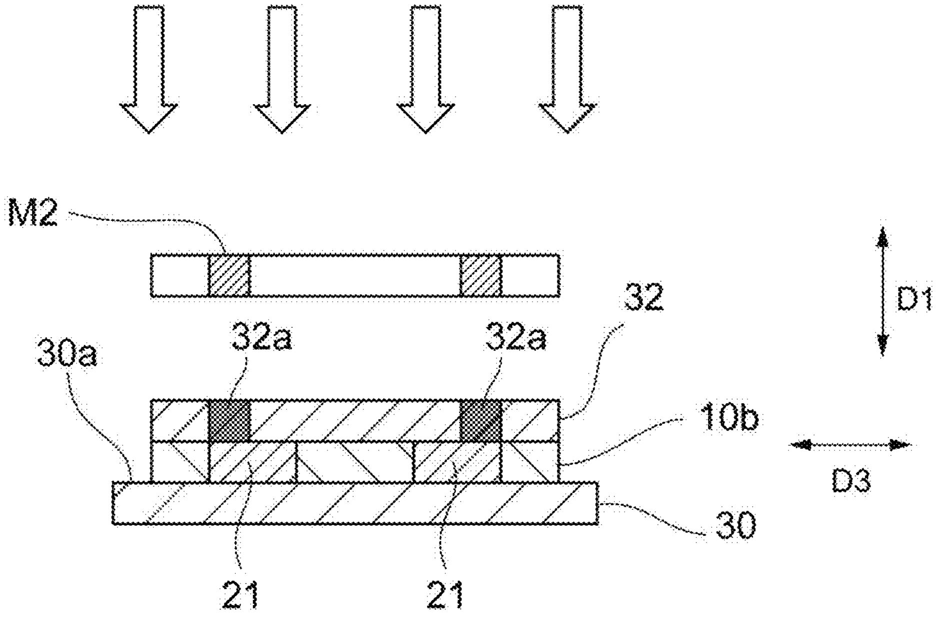

Then, as shown in FIG. 6C, the resist layer 32 is exposed. Here, a mask M2 made of, for example, Cr is used. The mask M2 has a pattern corresponding to the shapes of the plurality of second coil conductor portions 22*a*, the plurality of third coil conductor portions 23*a*, the terminal conductor 11, and the terminal conductor 12 shown in FIG. 3. In FIG. 6C, an unexposed portion 32*a* of the resist layer 32 is shown in gray.

Figure 7A:
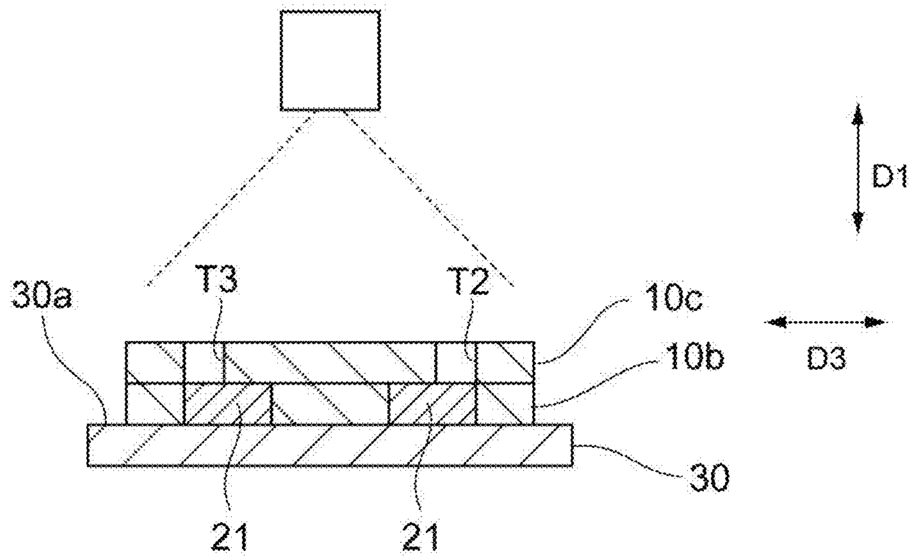
FIGS. 7A, 7B, and 7C are cross-sectional views for explaining the method for producing the multilayer coil component according to the embodiment.

Then, as shown in FIG. 7A, the resist layer 32 (see FIG. 6C) is developed. Since the resist layer 32 contains a negative photosensitive resin, the unexposed portion 32*a* (see FIG. 6C) of the resist layer 32 is removed. As a result, the insulator layer 10*c* including a second penetration portion T2 having a shape corresponding to the plurality of second coil conductor portions 22*a* (see FIG. 3), a third penetration portion T3 having a shape corresponding to the plurality of third coil conductor portions 23*a* (see FIG. 3), a penetration portion (not shown) having a shape corresponding to the terminal conductor 11 (see FIG. 3), and a penetration portion (not shown) having a shape corresponding to the terminal conductor 12 (see FIG. 3) is formed. The second penetration portion T2 exposes a part of the first coil conductor 21. The third penetration portion T3 exposes a part of the first coil conductor 21. The penetration portion having the shape corresponding to the terminal conductor 11 exposes the terminal conductor 11 provided in the insulator layer 10*b*. The penetration portion having the shape corresponding to the terminal conductor 12 exposes the terminal conductor 12 provided in the insulator layer 10*b*.

Figure 7B:
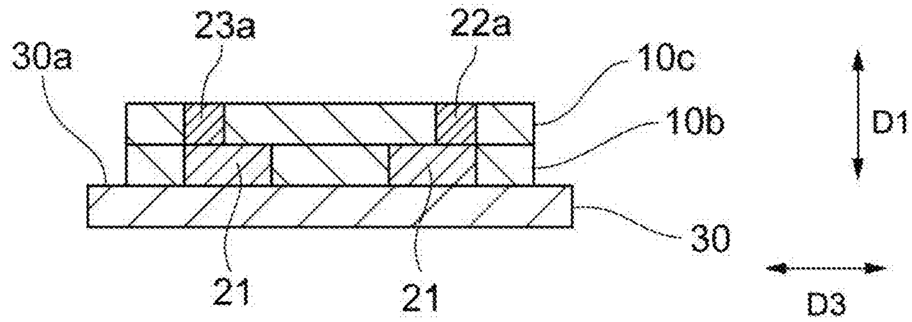

Then, as shown in FIG. 7B, by plating, the second coil conductor portion 22*a* is formed in the second penetration portion T2 (see FIG. 7B), and the third coil conductor portion 23*a* is formed in the third penetration portion T3 (see FIG. 7B). At this time, the terminal conductor 11 (see FIG. 3) and the terminal conductor 12 (see FIG. 3) are also formed in the penetration portions (not shown) of the insulator layer 10*c*. Accordingly, the insulator layer 10*c* provided with the plurality of second coil conductor portions 22*a*, the plurality of third coil conductor portions 23*a*, the terminal conductor 11, and the terminal conductor 12 is formed. The plating may be electrolytic plating or electroless plating. If necessary, the plurality of second coil conductor portions 22*a*, the plurality of third coil conductor portions 23*a*, the terminal conductor 11, and the terminal conductor 12 are polished.

As described above, the step S20 includes a step S21 of forming, on the insulator layer 10*b* formed with the first coil conductor 21 and the like, the insulator layer 10*c* (a second insulator layer) provided with the second penetration portion T2 and the third penetration portion T3 (see FIG. 4) and a step S22 of forming, by plating, the second coil conductor portion 22*a* in the second penetration portion T2 and the third coil conductor portion 23*a* in the third penetration portion T3 (see FIG. 4). The insulator layer 10*c* provided with the second penetration portion T2 and the third penetration portion T3 is formed by a photolithography method.

Figure 7C:
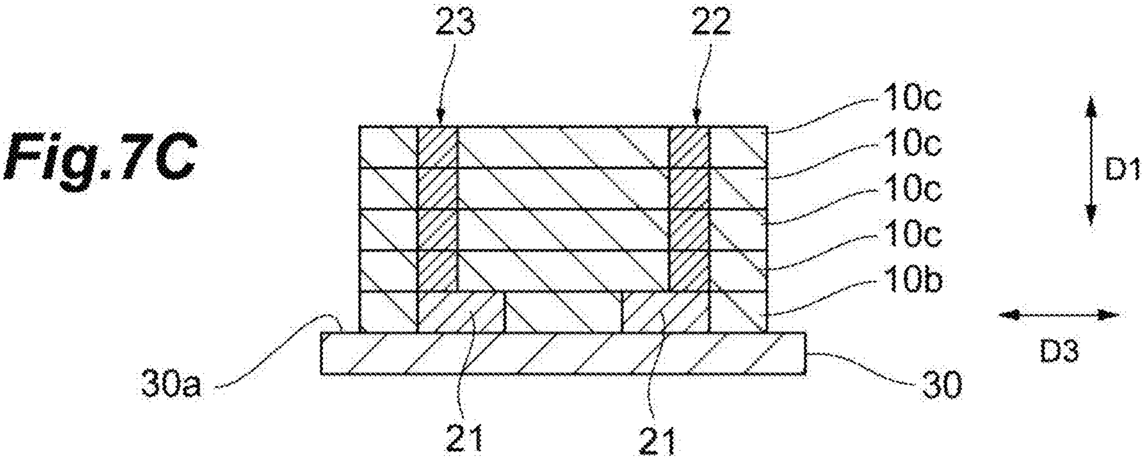

In the step S20, as shown in FIG. 7C, the step S21 and the step S22 are repeated, the insulator layer 10*c* formed with the plurality of second coil conductor portions 22*a* (see FIG. 7B), the plurality of third coil conductor portions 23*a* (see FIG. 7B), the terminal conductor 11 (see FIG. 3), and the terminal conductor 12 (see FIG. 3) is sequentially laminated. Accordingly, the second coil conductor 22 formed of the plurality of second coil conductor portions 22*a* is formed, and the third coil conductor 23 formed of the plurality of third coil conductor portions 23*a* is formed. Here, the plurality of second coil conductors 22 and the plurality of third coil conductors 23 disposed in the second direction D2 (see FIG. 2) are formed.

Figure 8A:
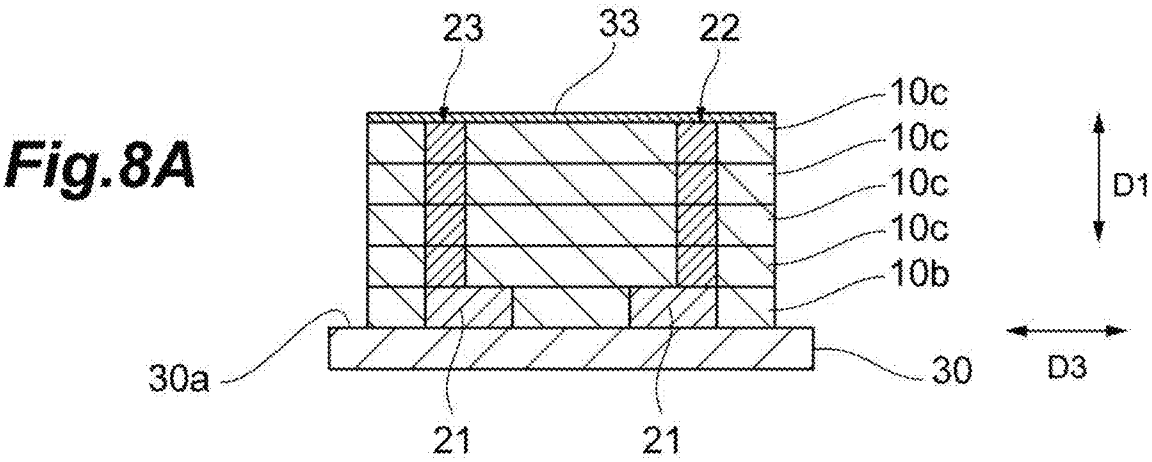
FIGS. 8A, 8B, and 8C are cross-sectional views for explaining the method for producing the multilayer coil component according to the embodiment.

In the step S30, as shown in FIG. 8A, a conductive layer 33 is formed on the insulator layer 10*c* provided with the second coil conductor 22, the third coil conductor 23, the terminal conductor 11 (see FIG. 3), and the terminal conductor 12 (see FIG. 3). The conductive layer 33 is formed by, for example, sputtering or electroless plating. The conductive layer 33 is made of, for example, Cr or Ti.

Figure 8B:
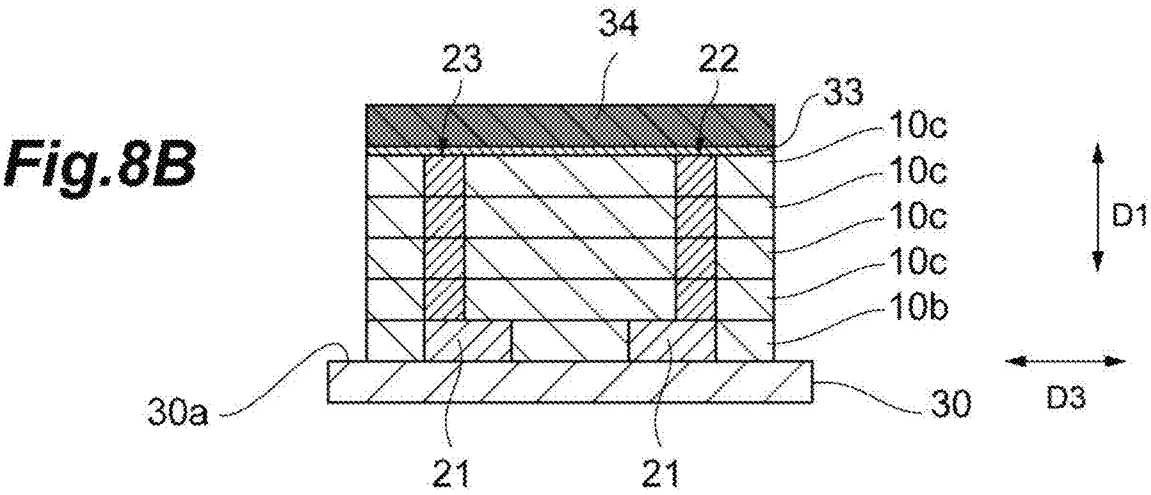

Then, as shown in FIG. 8B, a resist layer 34 is formed on the conductive layer 33. The resist layer 34 is formed by, for example, applying or printing an insulating paste containing a photosensitive resin. The photosensitive resin contained in the insulating paste is a positive type.

Figure 8C:
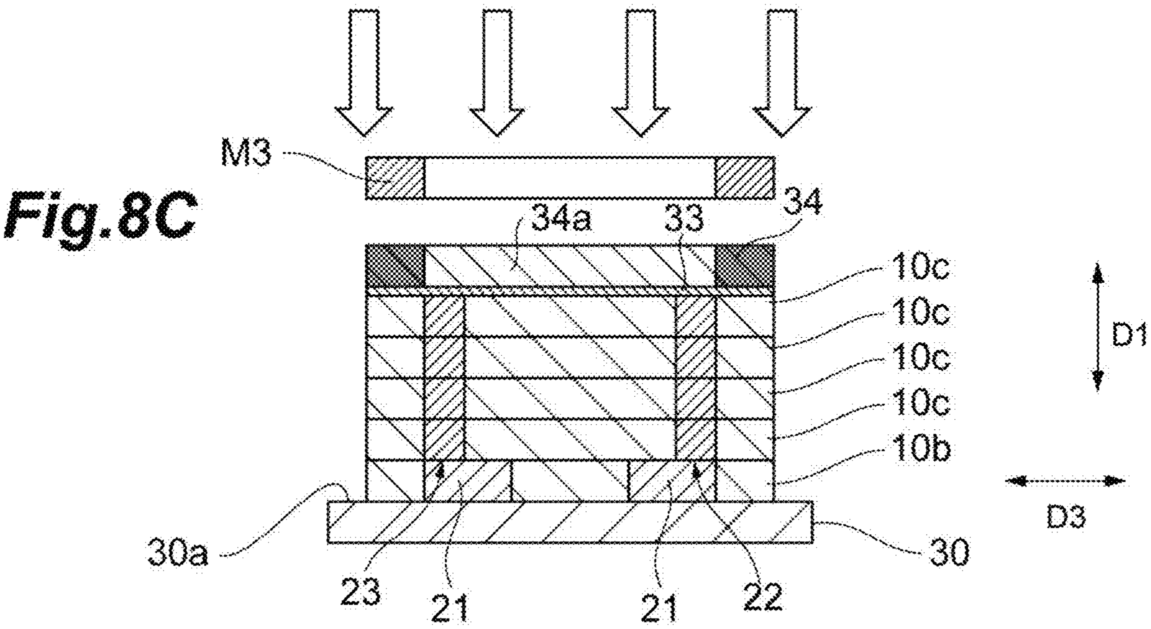

Then, as shown in FIG. 8C, the resist layer 34 is exposed. Here, a mask M3 made of, for example, Cr is used. The mask M3 has a pattern corresponding to the shapes of the plurality of fourth coil conductors 24, the terminal conductor 11, and the terminal conductors 12 shown in FIG. 3. In FIG. 8C, an unexposed portion of the resist layer 34 is shown in gray.

Figure 9A:
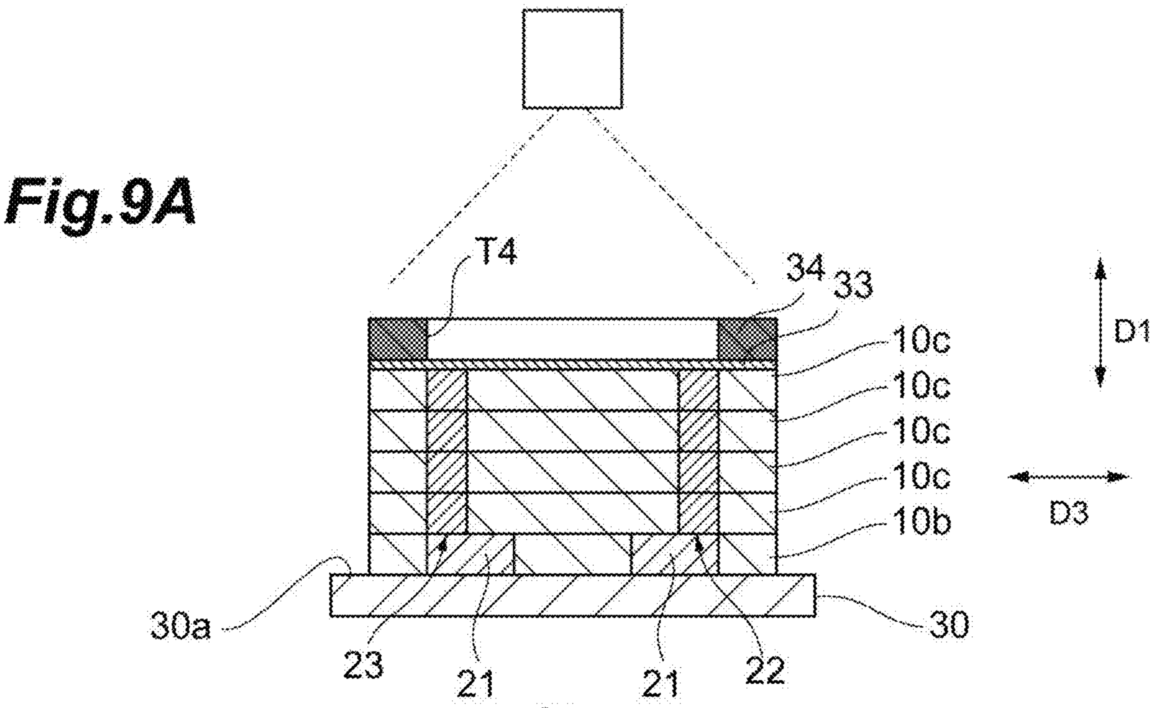
FIGS. 9A, 9B, and 9C are cross-sectional views for explaining the method for producing the multilayer coil component according to the embodiment.

Then, as shown in FIG. 9A, the resist layer 34 is developed. Since the resist layer 34 contains a positive photosensitive resin, the exposed portion 34*a* of the resist layer 34 is removed. As a result, the resist layer 34 provided with a fourth penetration portion T4 having a shape corresponding to the plurality of fourth coil conductors 24 (see FIG. 3), a penetration portion (not shown) having a shape corresponding to the terminal conductor 11 (see FIG. 3), and a penetration portion (not shown) having a shape corresponding to the terminal conductor 12 (see FIG. 3) is formed. The fourth penetration portion T4, the penetration portion having the shape corresponding to the terminal conductor 11, and the penetration portion having the shape corresponding to the terminal conductor 12 each expose a part of the conductive layer 33.

Figure 9B:
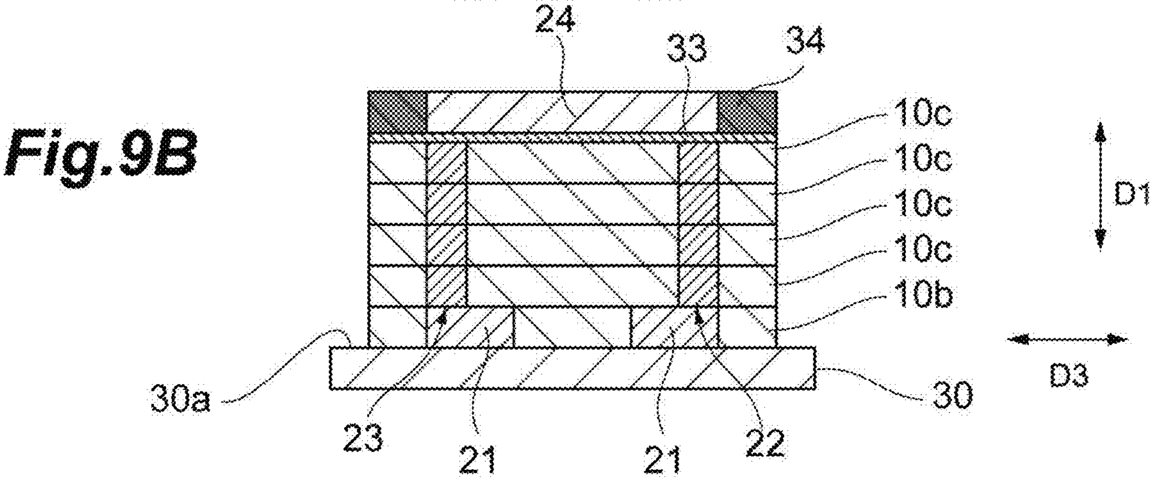

Then, as shown in FIG. 9B, the fourth coil conductor 24 is formed in the fourth penetration portion T4 (see FIG. 9A) by plating. At this time, the terminal conductor 11 (see FIG. 3) and the terminal conductor 12 (see FIG. 3) are also formed in the penetration portions (not shown) of the resist layer 34. The plating may be electrolytic plating or electroless plating. Here, the plurality of fourth coil conductors 24 disposed in the second direction D2 (see FIG. 2) is formed.

As described above, the step S30 includes a step S31 of forming the conductive layer 33 on the insulator layer 10*c* (see FIG. 4), a step S32 of forming, on the conductive layer 33, the resist layer 34 (a third insulator layer) provided with the fourth penetration portion T4 (see FIG. 4), and a step S33 of forming the fourth coil conductor 24 in the fourth penetration portion T4 by plating (see FIG. 4). The resist layer 34 provided with the fourth penetration portion T4 is formed by a photolithography method.

Figure 9C:
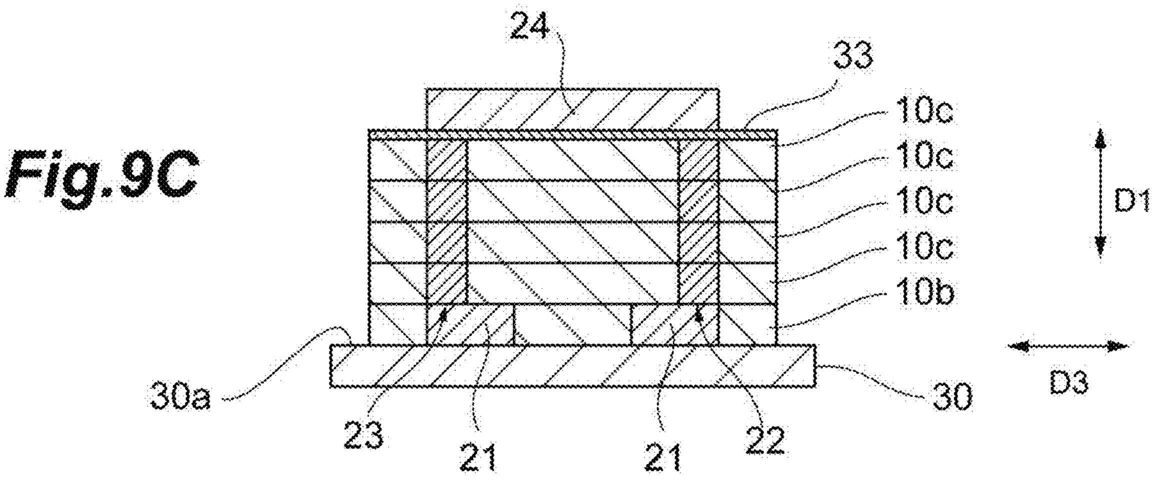

In the step S40, as shown in FIG. 9C, the resist layer 34 (see FIG. 9B) is removed. The resist layer 34 is peeled by, for example, a peeling liquid. Accordingly, a part of the conductive layer 33 is exposed.

Figure 10A:
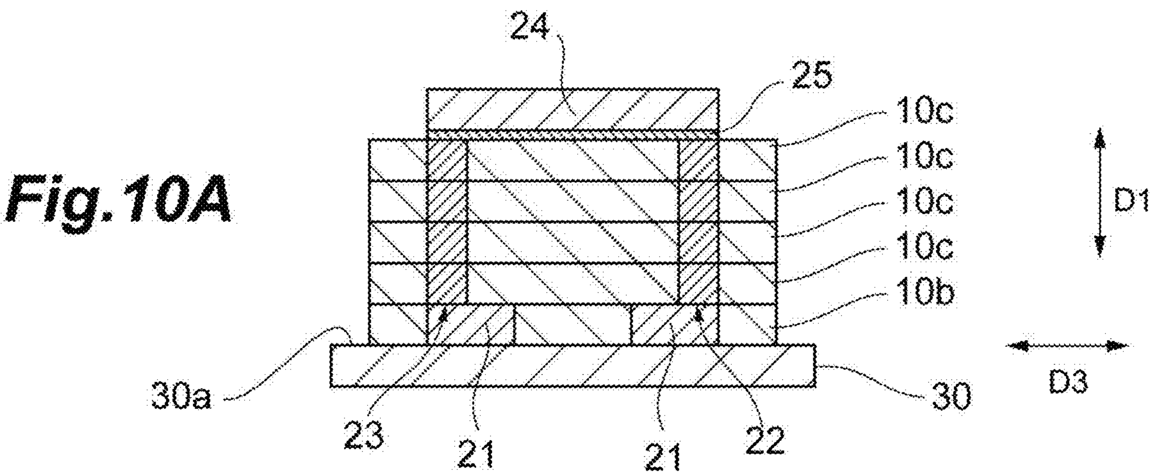
FIGS. 10A, 10B, and 10C are cross-sectional views for explaining the method for producing the multilayer coil component according to the embodiment.

Then, as shown in FIG. 10A, a portion of the conductive layer 33 (see FIG. 9C) exposed from the fourth coil conductor 24 is removed by etching. Accordingly, a part of the insulator layer 10*c* is exposed. Specifically, of the insulator layer 10*c*, a portion that does not overlap the plurality of fourth coil conductors 24, the terminal conductor 11 (see FIG. 3), and the terminal conductors 12 (see FIG. 3) when viewed from the first direction D1 is exposed. In addition, the plurality of conductive layers 25, the conductive layer 26 (see FIG. 3), and the conductive layer 27 (see FIG. 3) are formed from the conductive layer 33 (see FIG. 9C).

Figure 10B:
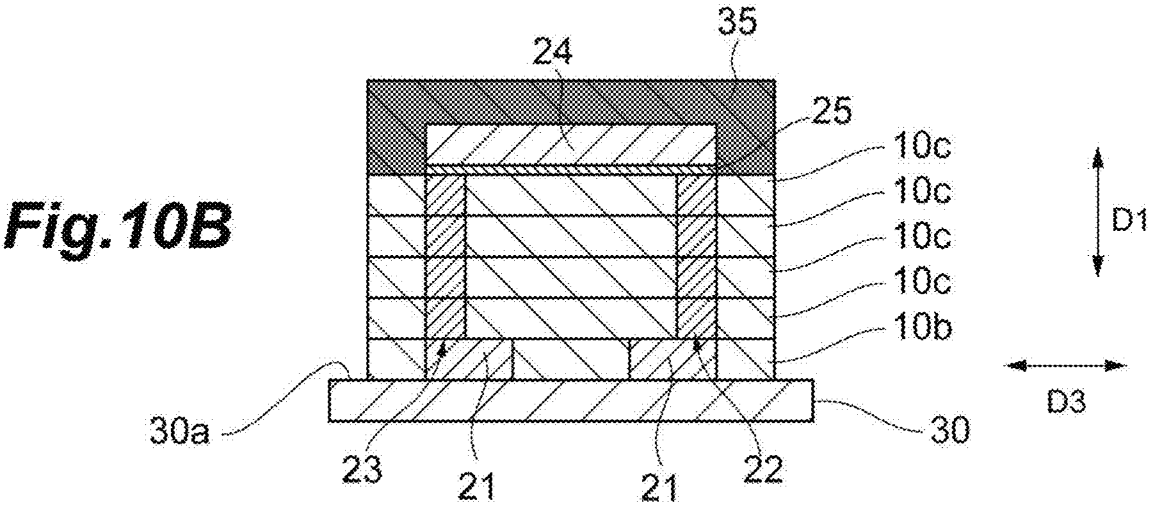

Then, as shown in FIG. 10B, a resist layer 35 that covers the plurality of fourth coil conductors 24, the terminal conductor 11 (see FIG. 3), and the terminal conductor 12 (see FIG. 3) is formed. The resist layer 35 is also formed on the insulator layer 10*c* exposed from the plurality of fourth coil conductors 24, the terminal conductor 11, and the terminal conductor 12 when viewed from the first direction D1. The resist layer 35 is formed in such a way that the upper surface of the resist layer 35 has no step and is planar. The resist layer 35 contains the constituent material of the insulator layer 10*d* and the insulator layer 10*e*. The resist layer 35 is formed by, for example, applying or printing an insulating paste containing a photosensitive resin. The photosensitive resin contained in the insulating paste is a negative type.

Figure 10C:
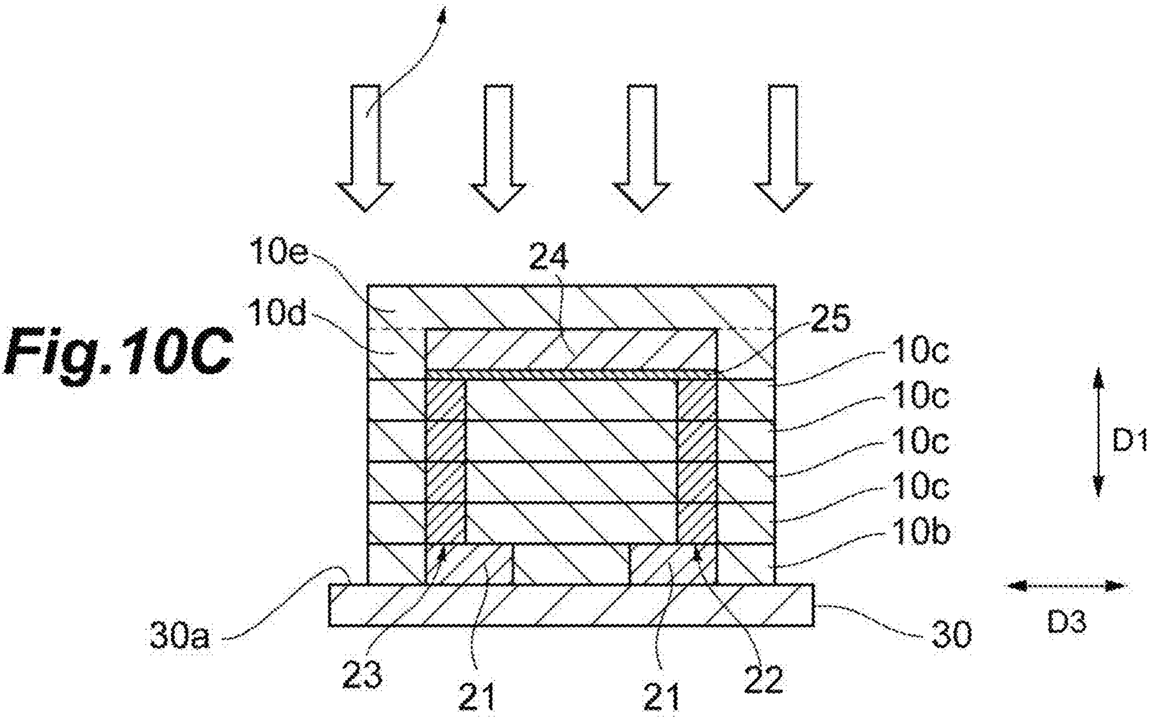

Then, as shown in FIG. 10C, the entire resist layer 35 (see FIG. 10B) is exposed. Accordingly, the insulator layer 10*d* provided with the plurality of fourth coil conductors 24, the terminal conductor 11 (see FIG. 3), and the terminal conductor 12 (see FIG. 3), and the insulator layer 10*e* are formed. The insulator layer 10*d* and the insulator layer 10*e* are integrally formed without boundaries in this manner. Although no mask is used here, a mask having a pattern that can expose the entire resist layer 35 may be used.

Figure 11A:
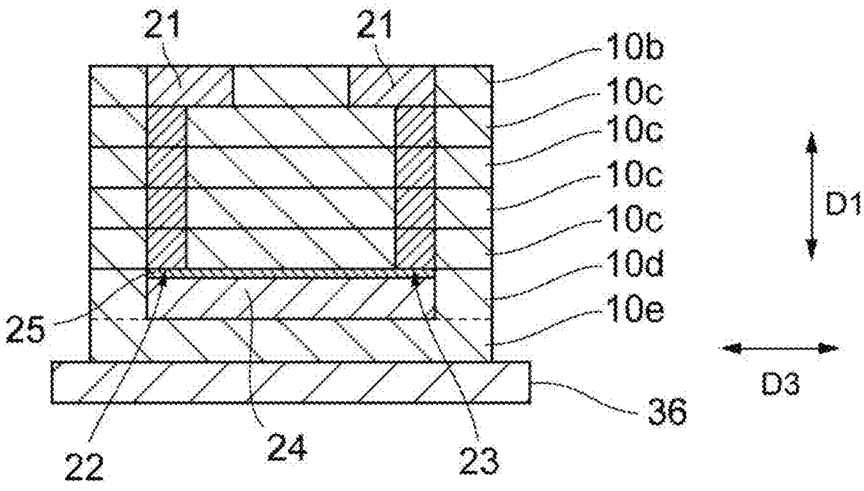
FIGS. 11A, 11B, and 11C are cross-sectional views for explaining the method for producing the multilayer coil component according to the embodiment.

In the step S50, the insulator layer 10*b* is peeled from the main face 30*a*, and the insulator layer 10*a* is formed on the insulator layer 10*b*. Specifically, first, as shown in FIG. 11A, the laminate obtained up to the step S40 is peeled from the main face 30*a* of the substrate 30 shown in FIG. 10C, and is reversed and disposed on a substrate 36. Accordingly, the insulator layer 10*e* is disposed at the lowermost position and opposed to the substrate 36, and the insulator layer 10*b* is disposed at the uppermost position. The substrate 36 may be made of, for example, an insulating material or may be made of the same material as that of the substrate 30 and have conductivity.

Figure 11B:
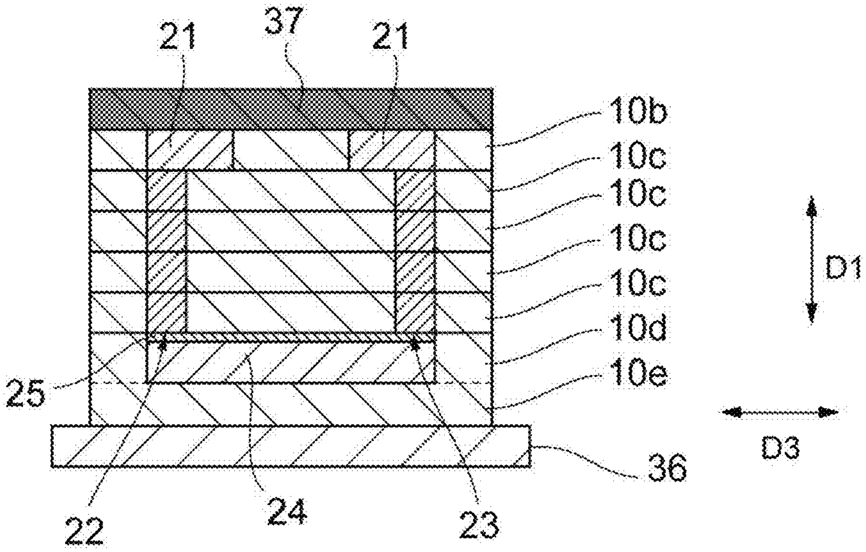

Then, as shown in FIG. 11B, a resist layer 37 is formed on the insulator layer 10*b*. The resist layer 37 contains the constituent material of the insulator layer 10*a*. The resist layer 37 is formed by, for example, applying or printing an insulating paste containing a photosensitive resin. The photosensitive resin contained in the insulating paste is a negative type.

Figure 11C:
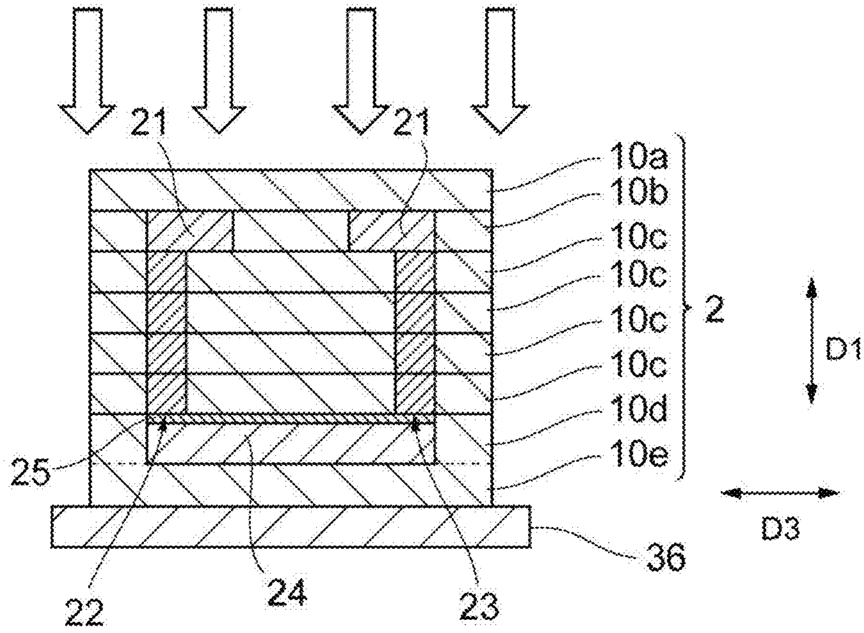

Then, as shown in FIG. 11C, the entire resist layer 37 (see FIG. 11B) is exposed. Accordingly, the insulator layer 10*a* is formed. Although no mask is used here, a mask having a pattern that can expose the entire resist layer 37 may be used. With the above, the multilayer coil component 1 is obtained.

As described above, in the method for producing the multilayer coil component 1 according to the present embodiment, the step S10 includes the step S11 of forming, on the main face 30*a*, the insulator layer 10*b* provided with the first penetration portion T1 exposing a part of the main face 30*a*. Since the main face 30*a* has conductivity, it is not necessary to form a conductive layer for electrical continuity before forming the first coil conductor 21 in the first penetration portion T1 by plating. In addition, it is not necessary to remove an unnecessary conductive layer after forming the first coil conductor 21. Accordingly, it is possible to prevent the number of steps from increasing, and to reduce takt time and costs. As a result, it is possible to improve the productivity.

In the step S20, the insulator layer 10*c* provided with the second penetration portion T2 and the third penetration portion T3 each exposing a part of the first coil conductor 21 is formed. Thus, it is not necessary to form a conductive layer for electrical continuity before forming, by plating, the second coil conductor portion 22*a* in the second penetration portion T2 and the third coil conductor portion 23*a* in the third penetration portion T3. In addition, it is not necessary to remove an unnecessary conductive layer after forming the second coil conductor portion 22*a* and the third coil conductor portion 23*a*. Thus, it is possible to further improve the productivity.

In the step S20, the step S21 of forming the insulator layer 10*c* and the step S22 of forming the second coil conductor portion 22*a* and the third coil conductor portion 23*a* are repeated. Thus, it is possible to increase the lengths of the second coil conductor 22 and the third coil conductor 23 in the first direction D1.

In the step S30, the conductive layer 33 is formed on the insulator layer 10*c* in advance. Thus, it is possible to form the fourth coil conductor 24 by plating in the portion of the insulator layer 10*c* where the second coil conductor 22 is not provided.

The method for producing the multilayer coil component 1 according to the present embodiment further includes the step S40 of forming the insulator layers 10*d* and 10*e*. Accordingly, the fourth coil conductor 24 is covered with the insulator layers 10*d* and 10*e*, and it is possible to protect the fourth coil conductor 24.

The method for producing the multilayer coil component 1 according to the present embodiment further includes the step S50 of forming the insulator layer 10*a*. Accordingly, the first coil conductor 21 is covered with the insulator layer 10*a*, and it is possible to protect the first coil conductor 21.

The insulator layers 10*b* and 10*c* and the resist layer 34 are each formed by a photolithography method. Accordingly, it is possible to pattern the insulator layers 10*b* and 10*c* and the resist layer 34 with high shape accuracy. That is, it is possible to form, in the insulator layers 10*b* and 10*c* and the resist layer 34, the penetration portions including the first penetration portion T1, the second penetration portion T2, the third penetration portion T3, and the fourth penetration portion T4 with high shape accuracy. As a result, it is possible to form the first coil conductor 21, the second coil conductor 22, the third coil conductor 23, the fourth coil conductor 24, and the terminal conductors 11 and 12 with high shape accuracy.

In the step S10, a plurality of first coil conductors 21 disposed in the second direction D2 is formed. In the step S30, a plurality of second coil conductors 22 and a plurality of third coil conductors 23 each disposed in the second direction D2 are formed. In the step S40, a plurality of fourth coil conductors 24 disposed in the second direction D2 is formed. Thus, it is possible to form a plurality of unit coils C, and it is possible for the coil 6 to have a multiple number of turns.

The resist layers 31, 32, 35, and 37 are made of the same material. Thus, the insulator layers 10*a*, 10*b*, 10*c*, 10*d*, and 10*e* are easily integrated with each other.

In the multilayer coil component 1, the second coil conductor 22 and the third coil conductor 23 each extend from the first coil conductor 21 in the first direction D1. In this manner, since the second coil conductor 22 and the third coil conductor 23 are directly connected to the first coil conductor 21, it is possible to omit, as compared with a configuration in which the second coil conductor 22 and the third coil conductor 23 are connected to the first coil conductor 21 via a conductive layer, at least a step of forming the conductive layer. Thus, it is possible to improve the productivity. In addition, since the second coil conductor 22 and the third coil conductor 23 are directly connected to the first coil conductor 21, problems of peeling, disconnection, and the like hardly occur. Thus, the reliability is improved. The adjacent second coil conductor portions 22*a* in the first direction D1 are directly connected to each other. The adjacent third coil conductor portions 23*a* in the first direction D1 are directly connected to each other. Thus, the reliability is further improved.

The embodiment of the present invention has been described above, but the present invention is not necessarily limited to the above described embodiment, and can be variously changed without departing from the gist.

Figure 12:
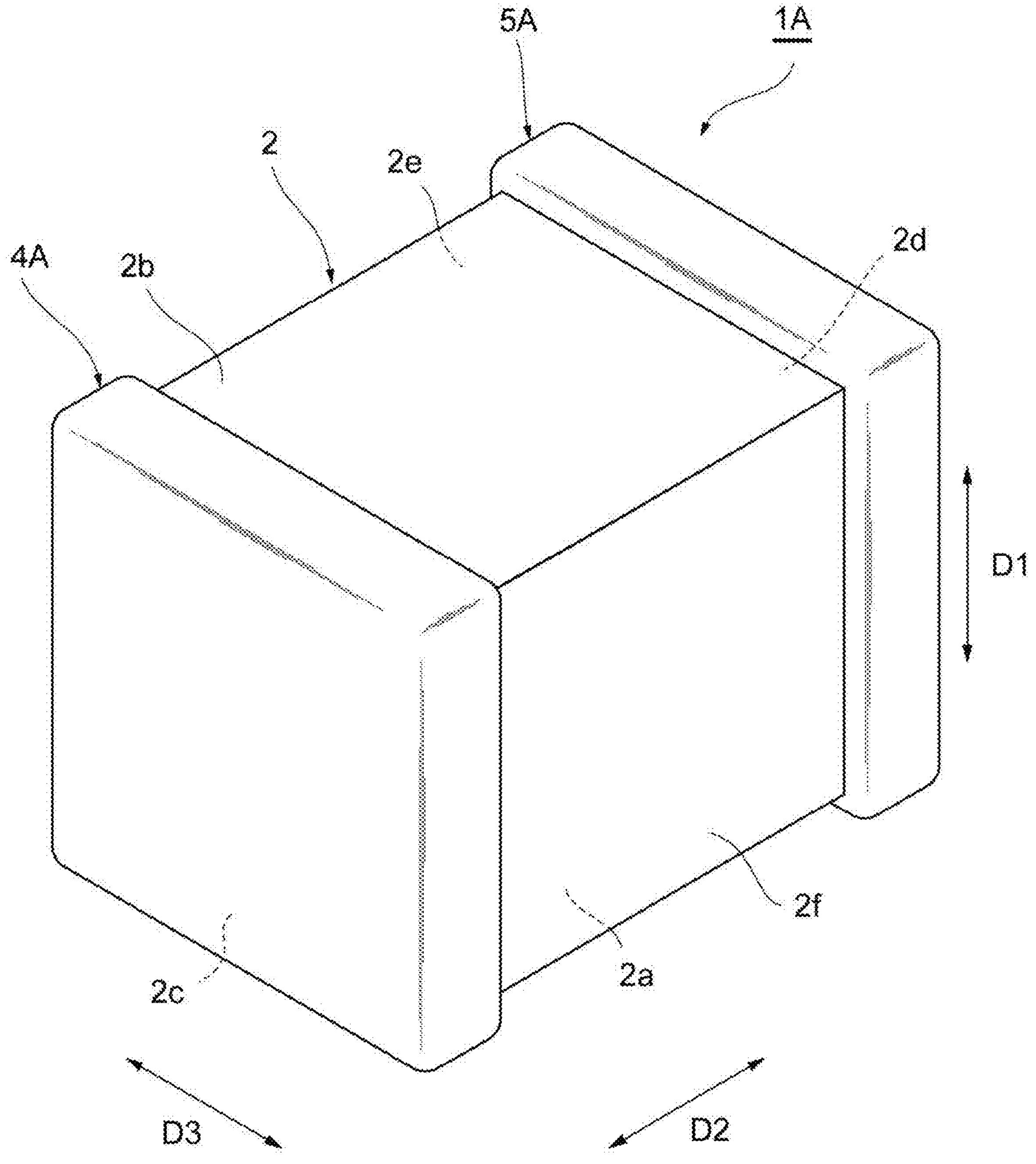
FIG. 12 is a perspective view of a multilayer coil component according to a first modified example.

FIG. 12 is a perspective view of a multilayer coil component according to a first modified example. As shown in FIG. 12, a multilayer coil component 1A according to the first modified example includes terminal electrodes 4A and 5A. The multilayer coil component 1A mainly differs from the multilayer coil component 1 (see FIG. 1) in this respect.

The terminal electrodes 4A and 5A are disposed at both end portions of the element body 2 in the second direction D2. The terminal electrodes 4A and 5A cover both end portions of the element body 2 in the second direction D2. The terminal electrodes 4A and 5A are apart from each other in the second direction D2. The terminal electrode 4A is disposed on the end face 2*c* side. The terminal electrode 4A covers the entire end face 2*c*, the end portions of the pair of main faces 2*a* and 2*b* on the end face 2*c* side, and the end portions of the pair of side faces 2*e* and 2*f* on the end face 2*c* side. The terminal electrode 5A is disposed on the end face 2*d* side. The terminal electrode 5A covers the entire end face 2*d*, the end portions of the pair of main faces 2*a* and 2*b* on the end face 2*d* side, and the end portions of the pair of side faces 2*e* and 2*f* on the end face 2*d* side.

Each of the terminal electrodes 4A and 5A contains a conductive material (for example, Ag or Pd). Each of the terminal electrodes 4A and 5A is formed as a sintered body of a conductive paste containing a conductive metal powder (for example, Ag powder or Pd powder) and glass frit. The surface of each of the terminal electrodes 4A and 5A may be formed with a plating layer. The plating layer is formed by, for example, electroplating or electroless plating. The plating layer contains, for example, Ni or Sn.

The method for producing the multilayer coil component 1A according to the first modified example is different from the method for producing the multilayer coil component 1 in that a step of forming the terminal electrodes 4A and 5A on both end portions of the element body 2 is included after the element body 2 and the coil 6 are formed without the terminal conductors 11 and 12 (see FIG. 3). The terminal electrodes 4A and 5A are formed by, for example, applying a conductive paste to both end portions of the element body 2 by a dipping method and firing it.

Figure 13:
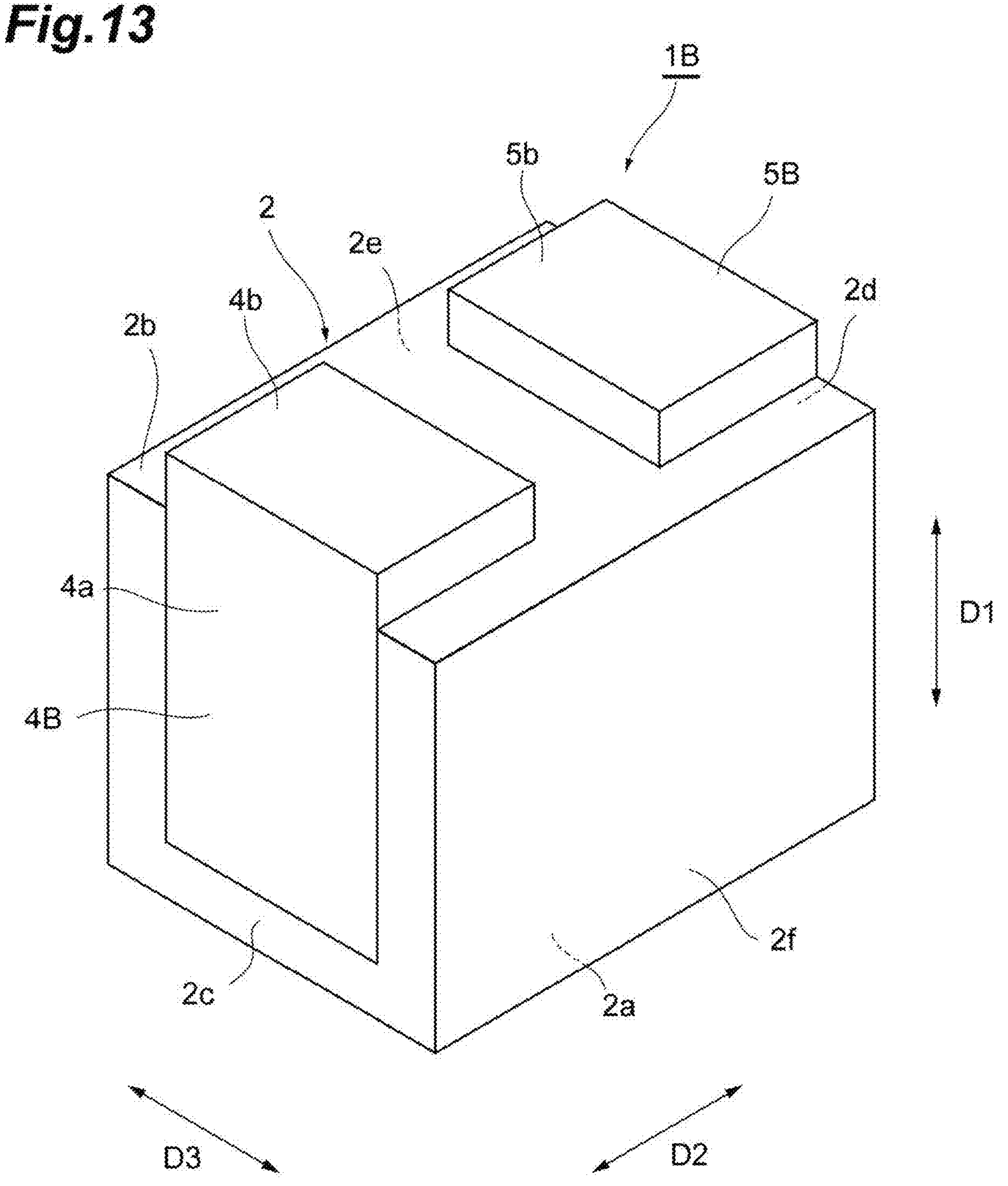
FIG. 13 is a perspective view of a multilayer coil component according to a second modified example.

FIG. 13 is a perspective view of a multilayer coil component according to a second modified example. As shown in FIG. 13, a multilayer coil component 1B according to the second modified example includes terminal electrodes 4B and 5B. The multilayer coil component 1B mainly differs from the multilayer coil component 1 (see FIG. 1) in this respect. The terminal electrodes 4B and 5B each have an L shape when viewed from the third direction D3. In the multilayer coil component 1B, the main face 2*b* constitutes a mounting surface.

The terminal electrode 4B includes an electrode portion 4*a* provide on the end face 2*c* side and an electrode portion 4*b* provided on the main face 2*b* side. The electrode portions 4*a* and 4*b* are integrally provided and are connected to each other at the ridge portion of the element body 2. The electrode portion 4*a* has a rectangular plate shape. One main face of the electrode portion 4*a* is embedded further inside the element body 2 than the end face 2*c* and is connected to one end of the coil 6 in the element body 2, similarly to the one main face of the terminal electrode 4 of the multilayer coil component 1 (see FIG. 1). The other main face of the electrode portion 4*a* is exposed from the end face 2*c* and constitutes the same plane as the end face 2*c*, similarly to the other main face of the terminal electrode 4 of the multilayer coil component 1 (see FIG. 1). The other main face of the electrode portion 4*a* may protrude from the end face 2*c*. The electrode portion 4*a* is apart from the main face 2*a* and the side faces 2*e* and 2*f* and is in contact with the main face 2*b* when viewed from the second direction D2.

The electrode portion 4*b* is disposed on the main face 2*b*. The electrode portion 4*b* has a rectangular plate shape. One main face of the electrode portion 4*b* is in contact with the main face 2*b*. The other main face of the electrode portion 4*b* protrudes from the main face 2*b*. The electrode portion 4*b* is apart from the end face 2*d* and the side faces 2*e* and 2*f* and is in contact with the end face 2*c* when viewed from the first direction D1. The lengths of the electrode portions 4*a* and 4*b* in the third direction D3 are equal to each other.

The terminal electrode 5B includes an electrode portion 5*a* provided on the end face 2*d* side and an electrode portion 5*b* provided on the main face 2*b* side. The electrode portions 5*a* and 5*b* are provided integrally and are connected to each other at the ridge portion of the element body 2. The electrode portion 5*a* has a rectangular plate shape. One main face of the electrode portion 5*a* is embedded further inside the element body 2 than the end face 2*d* and is connected to the other end of the coil 6 in the element body 2, similarly to the one main face of the terminal electrode 5 of the multilayer coil component 1 (see FIG. 1). The other main face of the electrode portion 5*a* is exposed from the end face 2*d* and constitutes the same plane as the end face 2*d*, similarly to the other main face of the terminal electrode 5 of the multilayer coil component 1 (see FIG. 1). The other main face of the electrode portion 5*a* may protrude from the end face 2*d*. The electrode portion 5*a* is apart from the main face 2*a* and the side faces 2*e* and 2*f* and is in contact with the main face 2*b* when viewed from the second direction D2.

The electrode portion 5*b* is disposed on the main face 2*b*. The electrode portion 5*b* has a rectangular plate shape. One main face of the electrode portion 5*b* is in contact with the main face 2*b*. The other main face of the electrode portion 5*b* protrudes from the main face 2*b*. The electrode portion 5*b* is apart from the end face 2*c* and the side faces 2*e* and 2*f* and is in contact with the end face 2*d* when viewed from the first direction D1. The lengths of the electrode portions 5*a* and 5*b* in the third direction D3 are equal to each other. The electrode portions 4*b* and 5*b* are apart from each other in the second direction D2.

With reference to FIGS. 14A to 17B, a method for producing the multilayer coil component 1B according to the second modified example will be described. The method for producing the multilayer coil component 1B is different from the method for producing the multilayer coil component 1 in the step S40 shown in FIG. 4. The step S40 of the method for producing the multilayer coil component 1B is the same as the step S40 of the method for producing the multilayer coil component 1 up to the step of forming the resist layer 35.

Figure 14A:
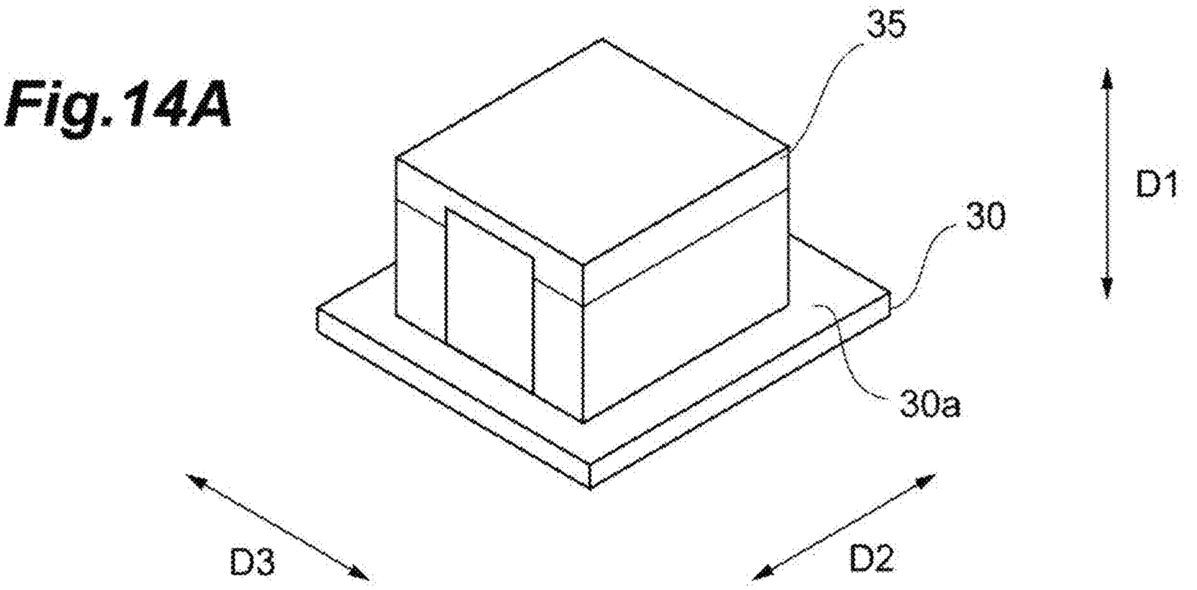
FIGS. 14A and 14B are perspective views for explaining a method for producing the multilayer coil component according to the second modified example.

FIG. 14A is a perspective view showing a state in which the resist layer 35 is formed in the step 40 (that is, the state shown in FIG. 10B). In FIGS. 14A to 17B, the layers formed before the resist layer 35 are simplified and integrally shown. As shown in FIG. 14A, a part of the electrode portions 4*a* and 5*a* (see FIG. 13) of the terminal electrodes 4B and 5B has been formed so far.

Figure 14B:
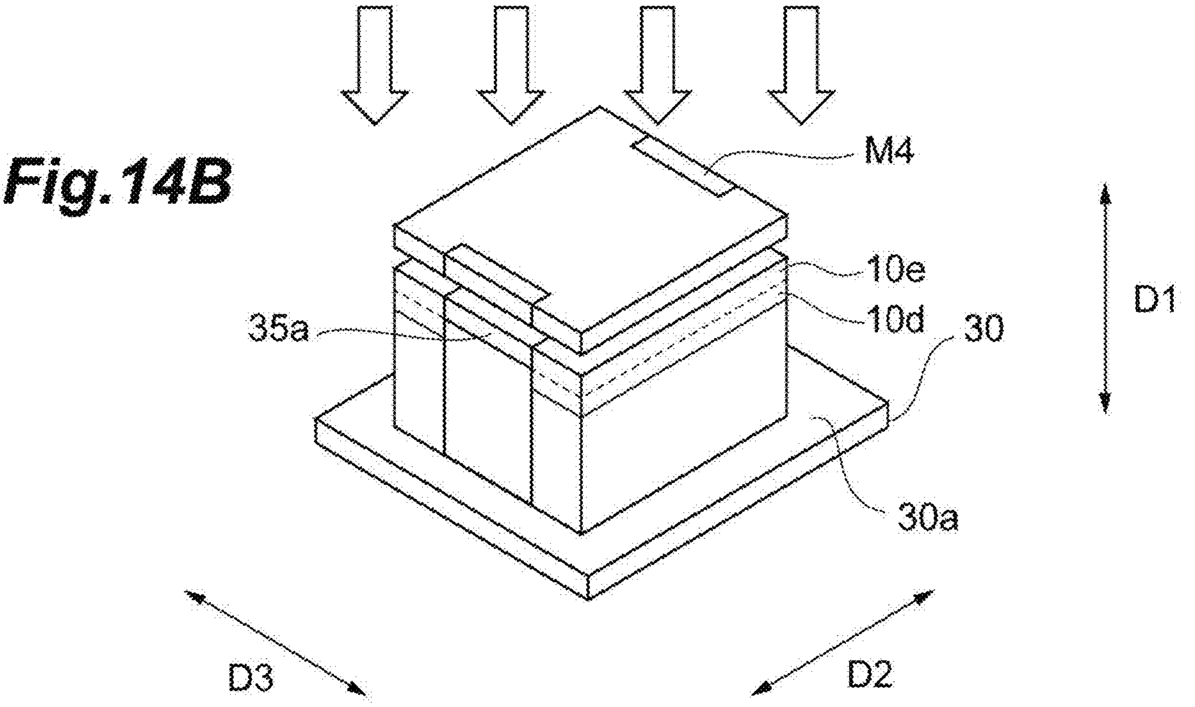

Then, as shown in FIG. 14B, the resist layer 35 is exposed. Here, a mask M4 made of, for example, Cr is used. The mask M4 has a pattern corresponding to the shapes of the terminal conductor 11 and the terminal conductor 12 shown in FIG. 3. Then, although not shown, the resist layer 35 is developed. Since the resist layer 35 contains a negative photosensitive resin, an unexposed portion 35*a* of the resist layer 35 is removed. As a result, the insulator layer 10*d* (see FIG. 15A) provided with the plurality of fourth coil conductors 24, the terminal conductor 11 (see FIG. 3), and the terminal conductor 12 (see FIG. 3) is formed. The insulator layer 10*e* (see FIG. 15A) provided with the penetration portions having shapes corresponding to the terminal conductor 11 and the terminal conductor 12 is formed. The insulator layer 10*d* and the insulator layer 10*e* are integrally formed without boundaries in this manner.

Figure 15A:
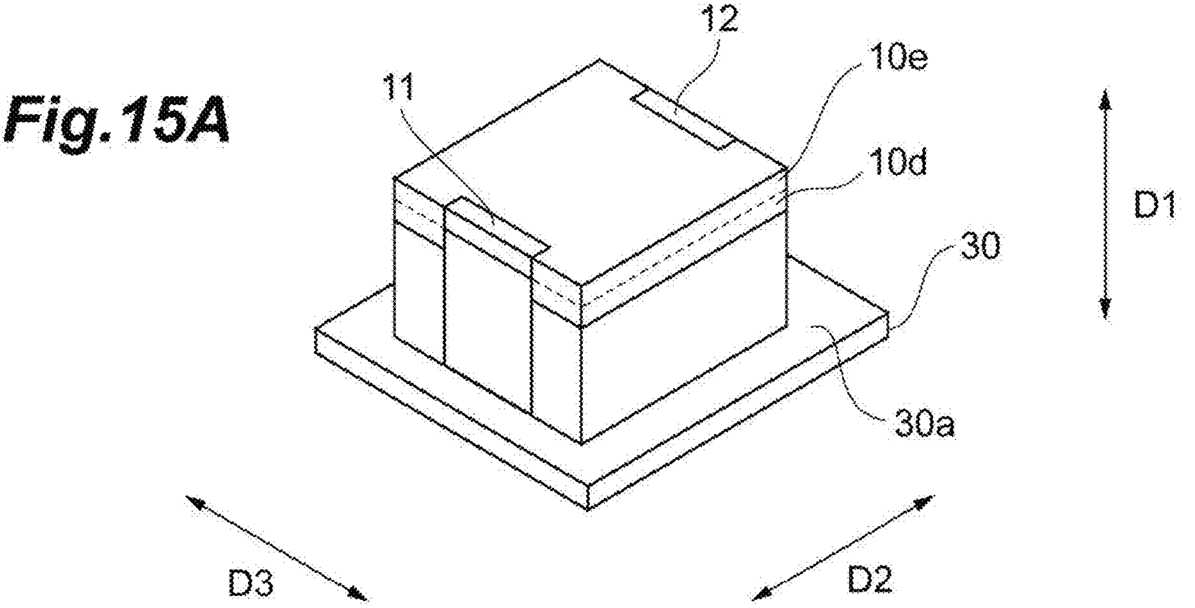
FIGS. 15A and 15B are perspective views for explaining the method for producing the multilayer coil component according to the second modified example.

Then, as shown in FIG. 15A, the terminal conductor 11 and the terminal conductor 12 are formed in the penetration portion of the insulator layer 10*e* by plating. Accordingly, the insulator layer 10*e* provided with the terminal conductor 11 and the terminal conductor 12 is formed. The plating may be electrolytic plating or electroless plating. If necessary, the terminal conductors 11 and 12 are polished.

Figure 15B:
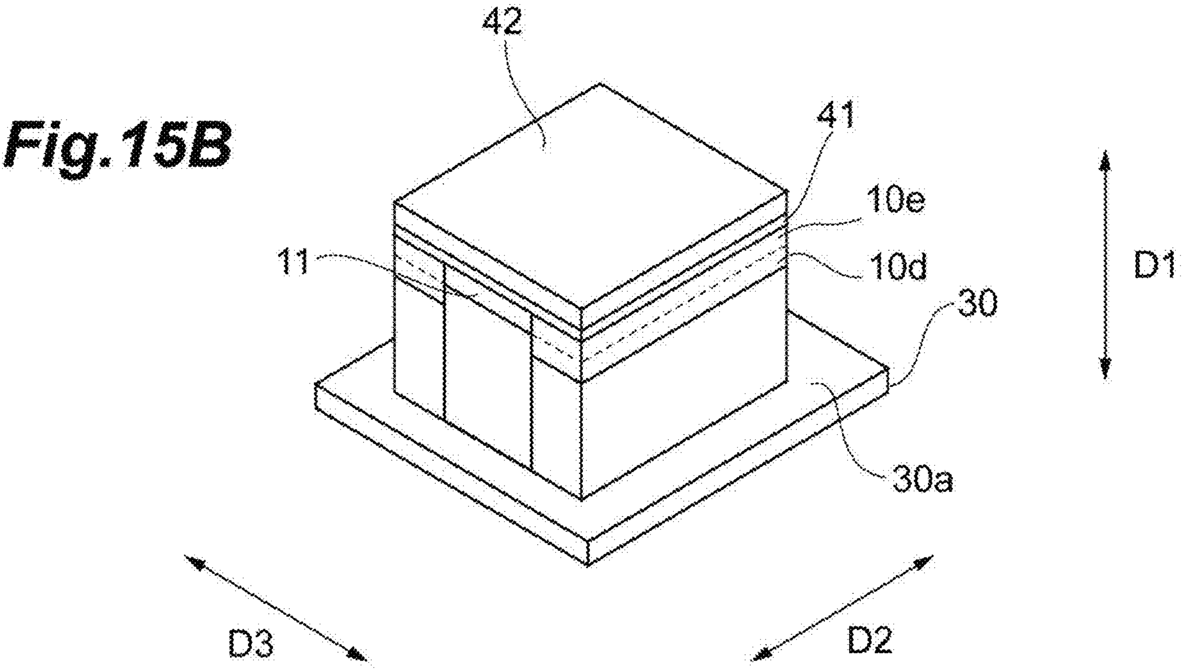

Then, as shown in FIG. 15B, a conductive layer 41 is formed on the insulator layer 10*e* provided with the terminal conductors 11 and 12, and, then, a resist layer 42 is formed on the conductive layer 41. The conductive layer 41 is formed by, for example, sputtering or electroless plating. The conductive layer 41 is made of, for example, Cr or Ti. The resist layer 42 is formed by, for example, applying or printing an insulating paste containing a photosensitive resin. The photosensitive resin contained in the insulating paste is a positive type.

Figure 16A:
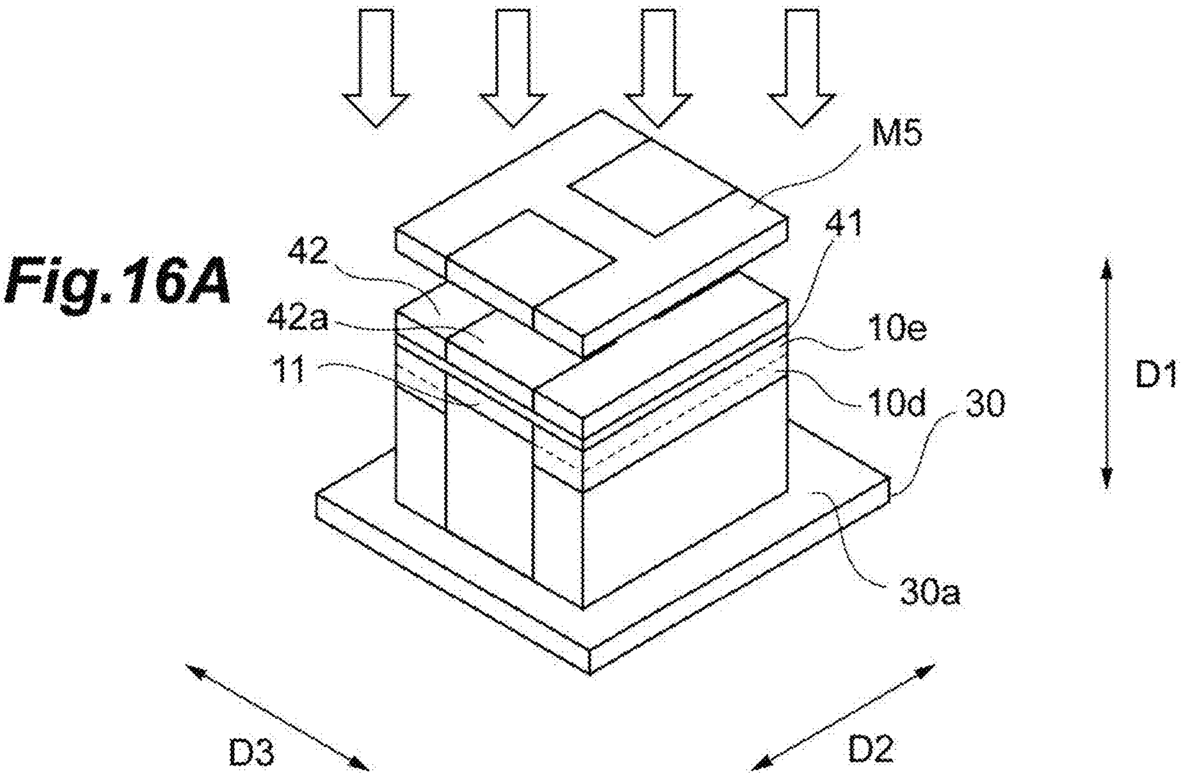
FIGS. 16A and 16B are perspective views for explaining the method for producing the multilayer coil component according to the second modified example.

Then, as shown in FIG. 16A, the resist layer 42 is exposed. Here, a mask M5 made of, for example, Cr is used. The mask M5 has a pattern corresponding to the shapes of the electrode portions 4*b* and 5*b* shown in FIG. 13. Then, although not shown, the resist layer 42 is developed. Since the resist layer 42 contains a positive photosensitive resin, an exposed portion 42*a* of the resist layer 42 is removed. As a result, the resist layer 42 provided with the penetration portion having the shapes corresponding to the electrode portions 4*b* and 5*b* is formed.

Figure 16B:
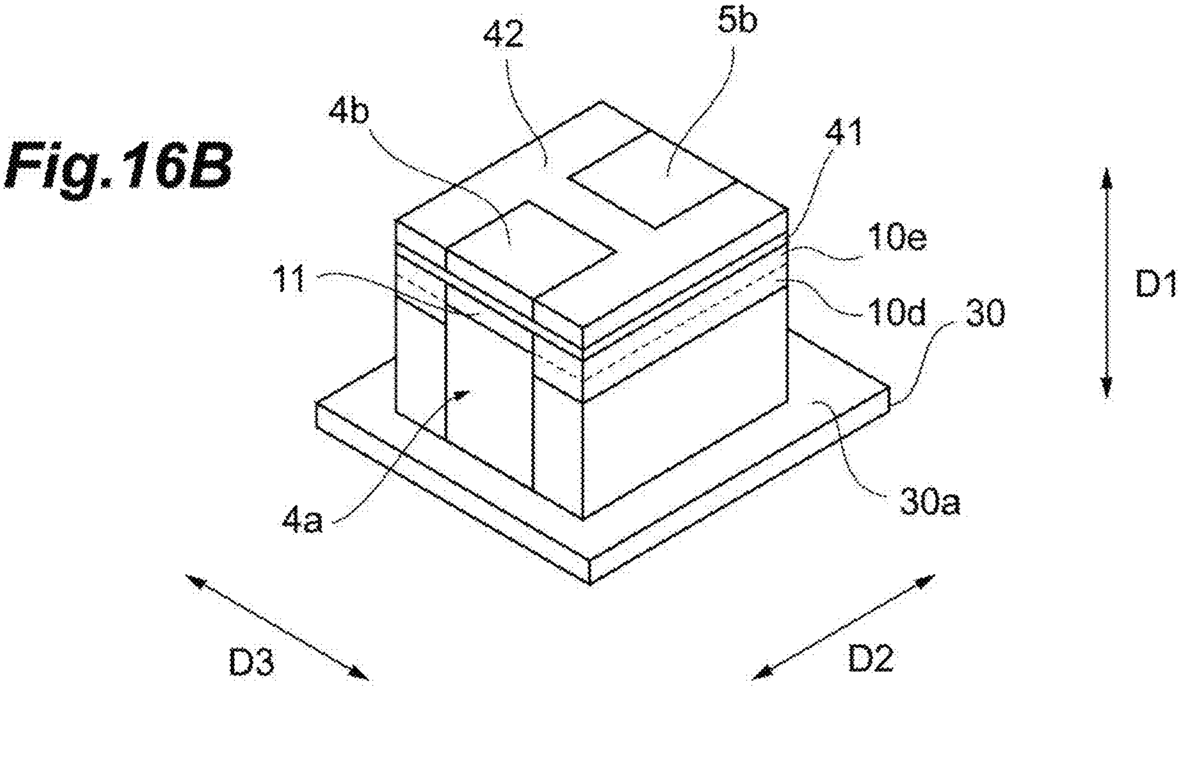

Then, as shown in FIG. 16B, the electrode portions 4*b* and 5*b* are formed in the penetration portion of the resist layer 42 by plating. The plating may be electrolytic plating or electroless plating. If necessary, the electrode portions 4*b* and 5*b* are polished.

Figure 17A:
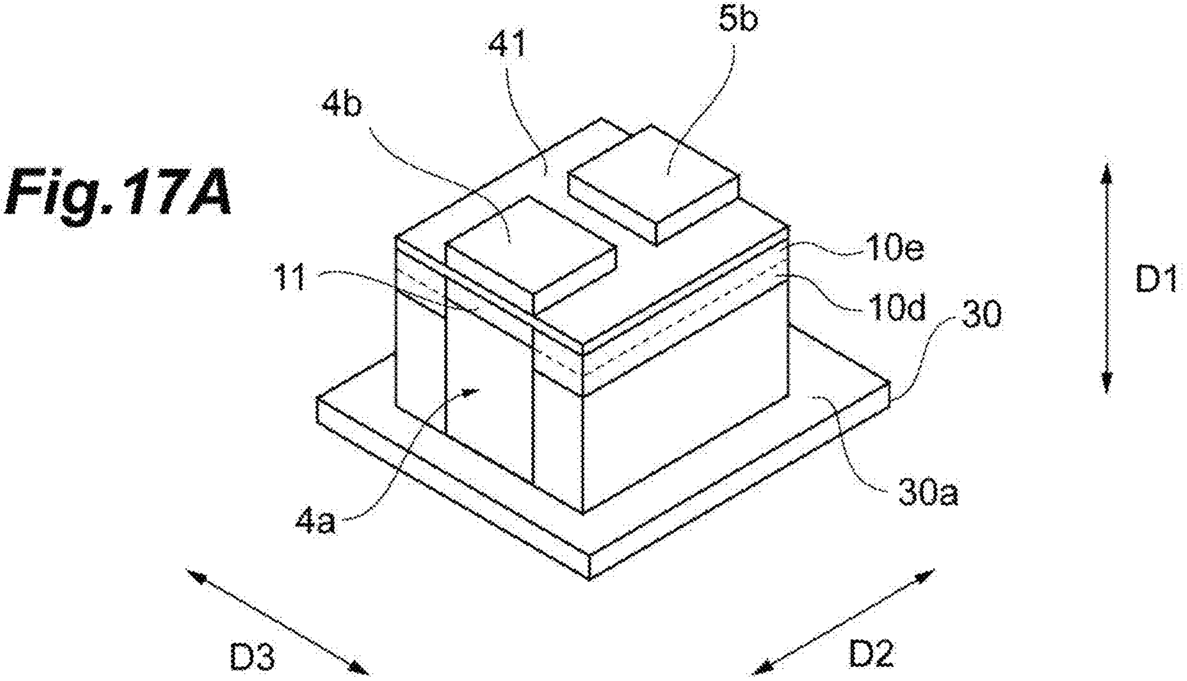
FIGS. 17A and 17B are perspective views for explaining the method for producing the multilayer coil component according to the second modified example.

Then, as shown in FIG. 17A, the resist layer 42 (see FIG. 17A) is removed. The resist layer 42 is peeled by, for example, a peeling liquid. Accordingly, a part of the conductive layer 41 is exposed.

Figure 17B:
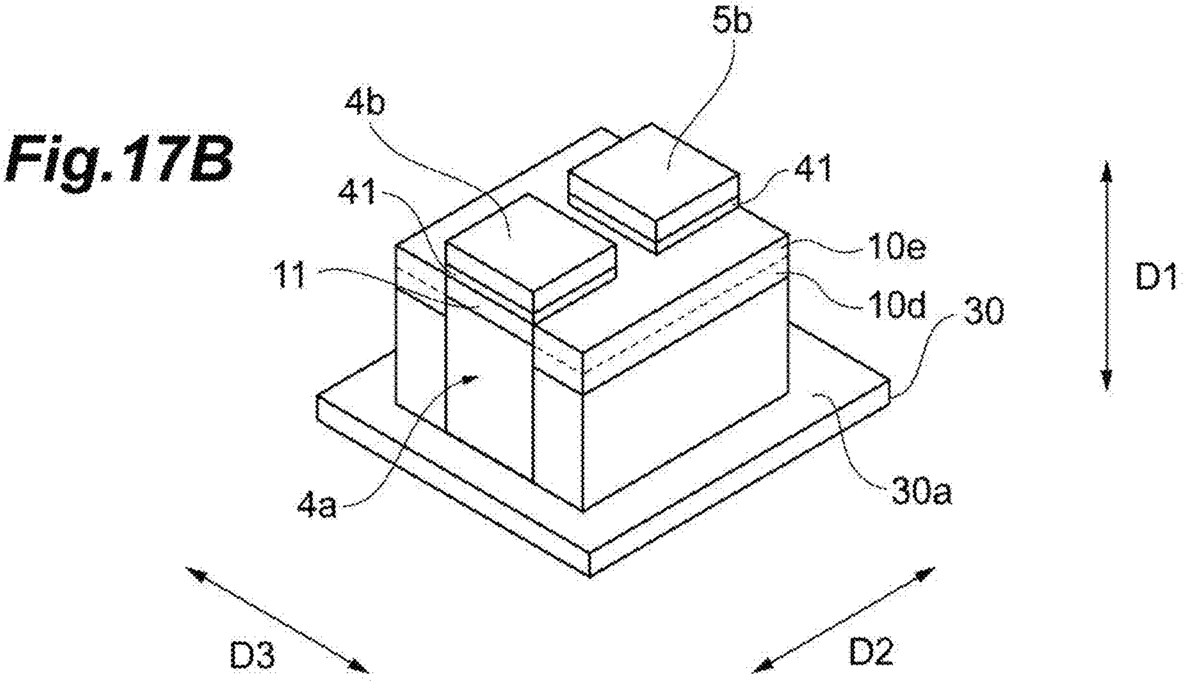

Then, as shown in FIG. 17B, a portion of the conductive layer 41 (see FIG. 17B) exposed from the electrode portions 4*b* and 5*b* is removed by etching. Accordingly, a part of the insulator layer 10*e* is exposed. Specifically, of the insulator layer 10*e*, a portion that does not overlap the electrode portions 4*b* and 5*b* when exposed in the first direction D1 is exposed.

Then, the step S50 is performed similarly to the method for producing the multilayer coil component 1. In the multilayer coil component 1B, since the electrode portions 4*b* and 5*b* of the terminal electrodes 4B and 5B are disposed on the main face 2*b* constituting the mounting surface, the multilayer coil component 1B is to be easily mounted on an electronic device.

Figure 18:
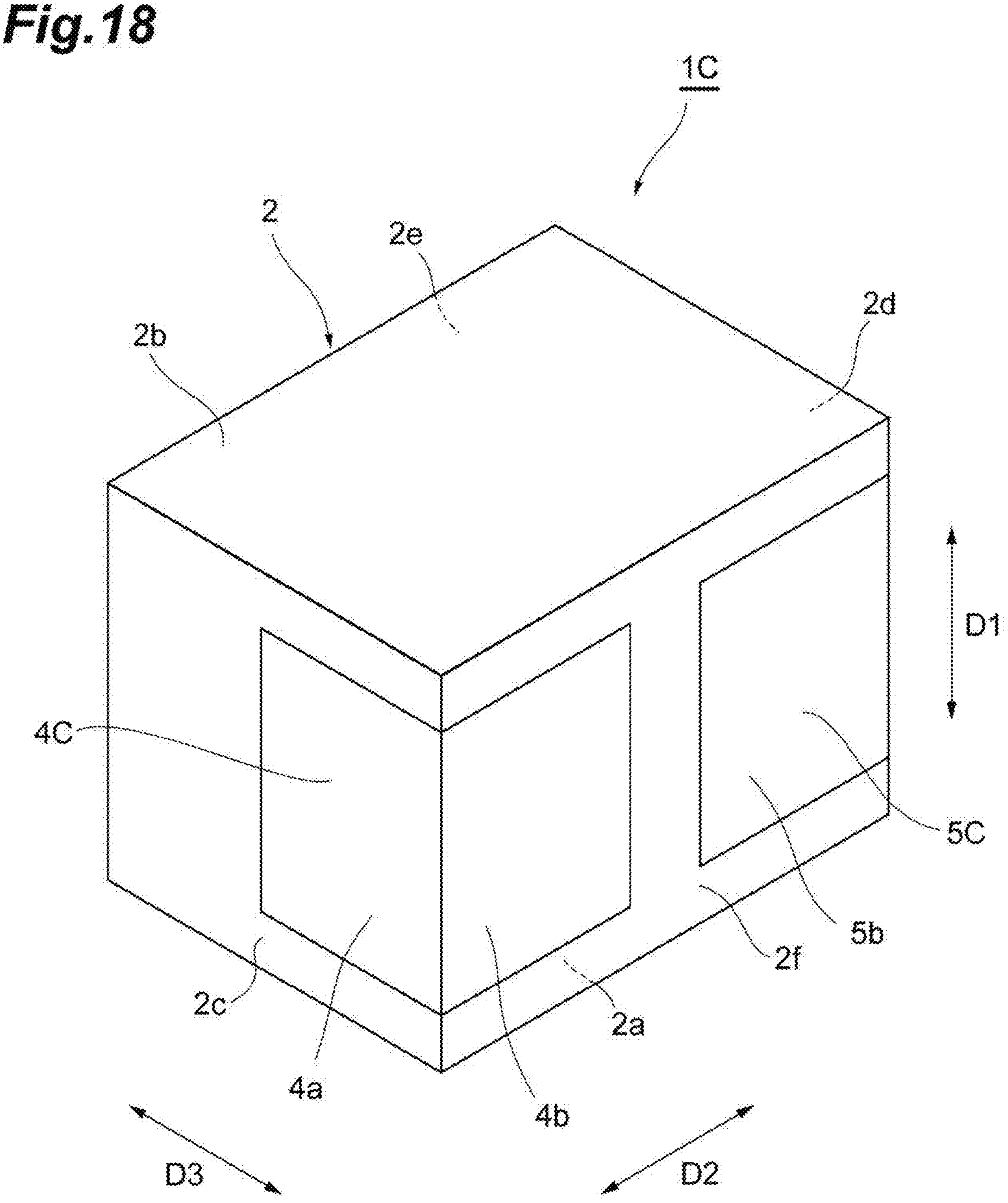
FIG. 18 is a perspective view of a multilayer coil component according to a third modified example.
Figure 19:
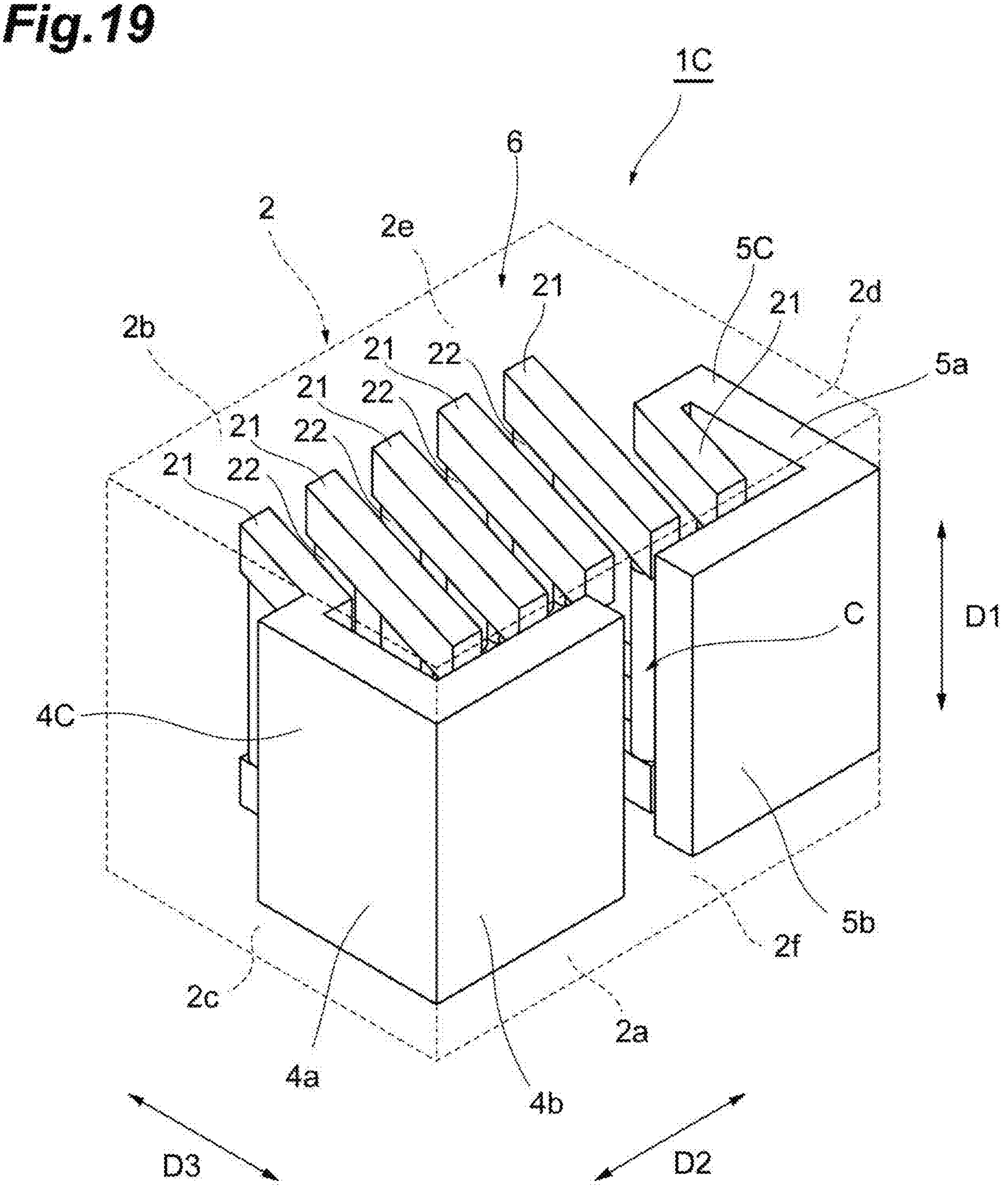
FIG. 19 is a perspective view showing an internal structure of the multilayer coil component in FIG. 18.

FIG. 18 is a perspective view of a multilayer coil component according to a third modified example. FIG. 19 is a perspective view showing an internal structure of the multilayer coil component in FIG. 18. As shown in FIGS. 18 and 19, a multilayer coil component 1C according to the third modified example includes terminal electrodes 4C and 5C. The multilayer coil component 1C mainly differs from the multilayer coil component 1 (see FIG. 1) in this respect. The terminal electrodes 4C and 5C each have an L shape when viewed from the first direction D1. In the multilayer coil component 1C, the side face 2*f* constitutes the mounting surface.

The terminal electrode 4C includes an electrode portion 4*a* provide on the end face 2*c* side and an electrode portion 4*b* provided on the side face 2*f* side. The electrode portions 4*a* and 4*b* are integrally provided and are connected to each other at the ridge portion of the element body 2. The electrode portion 4*a* has a rectangular plate shape. One main face of the electrode portion 4*a* is embedded further inside the element body 2 than the end face 2*c* and is connected to one end of the coil 6 in the element body 2, similarly to the one main face of the terminal electrode 4 of the multilayer coil component 1 (see FIG. 1). The other main face of the electrode portion 4*a* is exposed from the end face 2*c* and constitutes the same plane as the end face 2*c*, similarly to the other main face of the terminal electrode 4 of the multilayer coil component 1 (see FIG. 1). The other main face of the electrode portion 4*a* may protrude from the end face 2*c*. The electrode portion 4*a* is apart from the main faces 2*a* and 2*b* and the side face 2*e* and is in contact with the side face 2*f* when viewed from the second direction D2.

The electrode portion 4*b* has a rectangular plate shape. One main face of the electrode portion 4*b* is embedded further inside the element body 2 than the side face 2*f* and is apart from the coil 6 in the element body 2. The other main face of the electrode portion 4*b* is exposed from the side face 2*f* and constitutes the same plane as the side face 2*f*. The electrode portion 4*b* is apart from the main faces 2*a* and 2*b* and the end face 2*d* and is in contact with the end face 2*c* when viewed from the third direction D3. The lengths of the electrode portions 4*a* and 4*b* in the first direction D1 are equal to each other.

The terminal electrode 5C has an electrode portion 5*a* provided on the end face 2*d* side and an electrode portion 5*b* provided on the side face 2*f* side. The electrode portions 5*a* and 5*b* are provided integrally and are connected to each other at the ridge portion of the element body 2. The electrode portion 5*a* has a rectangular plate shape. One main face of the electrode portion 5*a* is embedded further inside the element body 2 than the end face 2*d* and is connected to the other end of the coil 6 in the element body 2, similarly to the one main face of the terminal electrode 5 of the multilayer coil component 1 (see FIG. 1). The other main face of the electrode portion 5*a* is exposed from the end face 2*d* and constitutes the same plane as the end face 2*d*, similarly to the other main face of the terminal electrode 5 of the multilayer coil component 1 (see FIG. 1). The other main face of the electrode portion 5*a* may protrude from the end face 2*d*. The electrode portion 5*a* is apart from the main faces 2*a* and 2*b* and the side face 2*e* and is in contact with the side face 2*f* when viewed from the second direction D2.

The electrode portion 5*b* has a rectangular plate shape. One main face of the electrode portion 5*b* is embedded further inside the element body 2 than the side face 2*f* and is apart from the coil 6 in the element body 2. The other main face of the electrode portion 5*b* is exposed from the side face 2*f* and constitutes the same plane as the side face 2*f*. The electrode portion 5*b* is apart from the main faces 2*a* and 2*b* and the side face 2*e* and is in contact with the side face 2*f* when viewed from the third direction D3. The lengths of the electrode portions 5*a* and 5*b* in the first direction D1 are equal to each other. The electrode portions 4*b* and 5*b* are apart from each other on the side face 2*f*.

The method for producing the multilayer coil component 1C is the same as the method for producing the multilayer coil component 1 except that the patterns of the masks M1, M2, and M3 are changed in such a way that the terminal conductors 11 and 12 each have an L-shape. In the multilayer coil component 1C, since the electrode portions 4*b* and 5*b* of the terminal electrodes 4C and 5C are exposed from the side face 2*f* constituting the mounting surface, the multilayer coil component 1C is to be easily mounted on an electronic device. In addition, the conductive layer 41 (see FIG. 15B) does not need to be provided unlike the multilayer coil component 1B.

In the methods for producing the multilayer coil components 1, 1A, 1B, and 1C, the substrate 30 may have, for example, a plurality of layers. In this case, at least the layer having the main face 30*a* is only required to have conductivity, and the other layers do not need to have conductivity. In the main face 30*a*, at least the portions exposed by the first penetration portion T1, the penetration portion having the shape corresponding to the terminal conductor 11, and the penetration portion having the shape corresponding to the terminal conductor 12 are only required to have conductivity, and the other portions may not have conductivity.

The resist layers 31, 32, 35, 37, and 42 is only required to be photosensitive-resin-containing layers containing a photosensitive resin, and may further contain, for example, a pigment. For example, the outermost resist layers 35 and 37 may include a high hardness material different from other resist layers.

What is claimed is:

1. A method for producing a multilayer coil component having an embedded conductive coil, the method comprising:

forming, directly on a face of an electrically conducting support substrate that is not a part of the multilayer coil component when the multilayer coil component is finished, a first coil conductor (i) of the conductive coil and (ii) having a longitudinal axis in a first direction parallel to the face, the face having conductivity;

forming a second coil conductor and a third coil conductor of the conductive coil spaced apart from each other in the first direction, each of the second coil conductor and the third coil conductor extending from the first coil conductor in a second direction orthogonal to the face and the first direction;

forming a fourth coil conductor of the conductive coil electrically connected to an end of the second coil conductor opposite to the first coil conductor and extending in a third direction parallel to the face that is different from the first direction; and removing the first coil conductor, the second coil conductor, the third coil conductor and the fourth coil conductor from the support substrate, wherein the forming the first, second and the third coil conductors comprise performing steps in order:

forming on the substrate, a first insulator layer with a first penetration portion having a shape corresponding to the first coil conductor;

exposing a part of the substrate through the first insulator layer, and forming, by plating, the first coil conductor in the first penetration portion;

forming a second insulator layer on the first coil conductor with a second penetration portion and a third penetration portion having a shape corresponding to the second and third coil conductors;

exposing a part of the first coil conductor through the second insulator layer, and forming by plating, the second and third coil conductors in the second and the third penetration portions respectively.

2. The method for producing the multilayer coil component according to claim 1, wherein the forming the second coil conductor and the third coil conductor further comprises:

forming, on the first insulator layer and the first coil conductor in the first penetration portion, a second insulator layer with (i) the second penetration portion having a shape corresponding to a second coil conductor portion constituting at least a part of the second coil conductor in the second direction and exposing a part of the first coil conductor through the second insulator layer, and (ii) the third penetration portion having a shape corresponding to a third coil conductor portion constituting at least a part of the third coil conductor in the second direction and exposing a part of the first coil conductor through the second insulator layer; and forming, by plating, the second coil conductor portion in the second penetration portion and the third coil conductor portion in the third penetration portion.

3. The method for producing the multilayer coil component according to claim 2, wherein, in the forming the second coil conductor and the third coil conductor, the forming the second insulator layer and the forming the second coil conductor portion and the third coil conductor portion are repeated.

4. The method for producing the multilayer coil component according to claim 2, wherein the forming the fourth coil conductor comprises:

forming a conductive layer on the second insulator layer, the second coil conductor portion in the second penetration portion and the third coil conductor portion in the third penetration portion;

forming, on the conductive layer, a third insulator layer with a fourth penetration portion having a shape corresponding to the fourth coil conductor and exposing a part of the conductive layer through the third insulator layer; and forming, by plating, the fourth coil conductor in the fourth penetration portion.

5. The method for producing the multilayer coil component according to claim 4, the method further comprising forming, after the fourth coil conductor is formed, a fourth insulator layer by removing the third insulator layer and a portion of the conductive layer to expose a part of the second insulator layer, the fourth insulator layer covering the part of the second insulator layer that is exposed and the fourth coil conductor.

6. The method for producing the multilayer coil component according to claim 4, the method further comprising forming, after the fourth coil conductor is formed, a fifth insulator layer on the first insulator layer formed with the first coil conductor by peeling the first insulator layer formed with the first coil conductor from the face.

7. The method for producing the multilayer coil component according to claim 1, wherein the first insulator layer is formed by a photolithography method.

8. The method for producing the multilayer coil component according to claim 1, wherein in the forming the first coil conductor, a plurality of the first coil conductor legs spaced in the second direction is formed, in the forming the second coil conductor and the third coil conductor, a plurality of the second coil conductor legs and a plurality of the third coil conductor legs in the second direction are formed, and in the forming the fourth coil conductor, a plurality of the fourth coil conductor legs spaced in the second direction is formed.

* * * * *